United States Patent
Mizunuma et al.

(10) Patent No.: US 10,345,761 B2
(45) Date of Patent: Jul. 9, 2019

(54) INFORMATION PROCESSING APPARATUS, CONTROL METHOD, AND PROGRAM

(71) Applicant: SONY CORPORATION, Tokyo (JP)

(72) Inventors: Hiroyuki Mizunuma, Tokyo (JP); Yuhei Taki, Kanagawa (JP); Tsubasa Tsukahara, Tokyo (JP); Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/119,054

(22) PCT Filed: Feb. 9, 2015

(86) PCT No.: PCT/JP2015/053564
§ 371 (c)(1),
(2) Date: Aug. 15, 2016

(87) PCT Pub. No.: WO2015/141328
PCT Pub. Date: Sep. 24, 2015

(65) Prior Publication Data
US 2017/0052512 A1    Feb. 23, 2017

(30) Foreign Application Priority Data

Mar. 18, 2014    (JP) .................................. 2014-055052

(51) Int. Cl.
*G04G 21/00*    (2010.01)
*G06F 1/16*    (2006.01)
(Continued)

(52) U.S. Cl.
CPC ............. *G04G 21/00* (2013.01); *G04B 47/06* (2013.01); *G04G 21/04* (2013.01); *G06F 1/163* (2013.01);
(Continued)

(58) Field of Classification Search
None
See application file for complete search history.

(56) References Cited

U.S. PATENT DOCUMENTS

| 2013/0222270 A1 | 8/2013 | Winkler et al. |
| 2014/0125620 A1* | 5/2014 | Panther .................. G06F 3/011 345/173 |

(Continued)

FOREIGN PATENT DOCUMENTS

| CN | 103581428 A | 2/2014 |
| EP | 2698686 A2 | 2/2014 |

(Continued)

OTHER PUBLICATIONS

Mano, et al., "Action Classification and Video Retrieval in a Ubiquitous home using Ubiquitous Sensors and Wearable Sensors", EICE Technical Report, Mar. 2007, pp. 65-70.

(Continued)

*Primary Examiner* — Christopher J Kohlman
(74) *Attorney, Agent, or Firm* — Paratus Law Group, PLLC

(57) ABSTRACT

There is provided an information processing apparatus, control method, and program that allow for recognition of a state of an arm on the basis of determination of whether the information processing apparatus is worn on the left arm or the right arm, the information processing apparatus including: a determination unit configured to determine whether the information processing apparatus is worn on a user's right arm or left arm; a recognition unit configured to recognize a state of the arm; and a control unit configured to perform predetermined control on a device included in the information processing apparatus according to the recognized state of the arm. The recognition unit switches settings of a parameter which is used in the recognition of the state (Continued)

STATE 1
STATE IN WHICH HAND IS LOWERED

STATE 2
STATE IN WHICH HAND IS RAISED

STATE 3
STATE IN WHICH HAND IS HELD CLOSE TO EAR of the arm, according to a result of the determination by the determination unit.

21 Claims, 24 Drawing Sheets

(51) Int. Cl.
    *G06F 3/0488*     (2013.01)
    *G04G 21/04*     (2013.01)
    *G04B 47/06*     (2006.01)

(52) U.S. Cl.
    CPC ........ *G06F 1/1694* (2013.01); *G06F 3/04883* (2013.01)

(56) References Cited

U.S. PATENT DOCUMENTS

| | | | |
|---|---|---|---|
| 2014/0171156 A1* | 6/2014 | Pattikonda | H04M 1/6041 455/569.1 |
| 2014/0337621 A1* | 11/2014 | Nakhimov | G06F 1/163 713/168 |
| 2015/0026647 A1* | 1/2015 | Park | G06F 3/0488 715/863 |
| 2015/0212722 A1* | 7/2015 | Leung | G06F 3/04847 726/19 |
| 2016/0349803 A1* | 12/2016 | Dusan | G04C 3/002 |
| 2017/0003765 A1* | 1/2017 | Shedletsky | G06F 1/163 |

FOREIGN PATENT DOCUMENTS

| | | |
|---|---|---|
| JP | 2002-358149 | 12/2002 |
| JP | 2003-061176 A | 2/2003 |
| JP | 2013-061176 | 4/2013 |

OTHER PUBLICATIONS

Sep. 28, 2017, European Search Report issued for related EP application No. 15765782.6.

Aug. 29, 2018, Chinese Office Action issued for related CN application No. 201580012548.0.

Nov. 6, 2018, Japanese Office Action for related JP application No. 2016-508591.

\* cited by examiner

FIG. 7

| DEVICE | | | STATE 1 | STATE 2 | STATE 3 |
|---|---|---|---|---|---|
| TOUCH SENSOR | | | OFF | ON | OFF |
| MOTION SENSOR | ACCELERATION SENSOR | | ON<br>SAMPLING RATE: LOW | ON<br>SAMPLING RATE: LOW | ON<br>SAMPLING RATE: LOW |
| | GYROSCOPIC SENSOR | | OFF | OFF | OFF |
| DISPLAY | | | OFF<br>(OR SIMPLE DISPLAY SUCH AS ONLY CLOCK ETC.)<br>REFRESH RATE: LOW | ON<br>REFRESH RATE: HIGH | OFF<br>(OR SIMPLE DISPLAY SUCH AS ONLY CLOCK ETC.)<br>REFRESH RATE: LOW |
| SPEAKER | BACK SPEAKER | | ON<br>OUTPUT: HIGH | OFF | ON<br>OUTPUT: LOW |
| | FRONT SPEAKER | | OFF | ON<br>OUTPUT: HIGH | OFF |
| MIC | | | OFF | ON<br>SENSITIVITY: HIGH | ON<br>SENSITIVITY: LOW |

※ACCELERATION SENSOR AND GYROSCOPIC SENSOR MAY BE REVERSED

FIG.8

| DEVICE | STATE 1 | STATE 2 | STATE 3 |
|---|---|---|---|
| TOUCH SENSOR | OFF | ON | OFF |
| MOTION SENSOR | ON<br>SAMPLING RATE: LOW | ON<br>SAMPLING RATE: LOW | ON<br>SAMPLING RATE: LOW |
| DISPLAY | OFF<br>(OR SIMPLE DISPLAY SUCH AS ONLY CLOCK ETC.)<br>REFRESH RATE: LOW | ON<br>REFRESH RATE: HIGH | OFF<br>(OR SIMPLE DISPLAY SUCH AS ONLY CLOCK ETC.)<br>REFRESH RATE: LOW |
| SPEAKER | ON<br>OUTPUT: HIGH | OFF | ON<br>OUTPUT: LOW |
| MIC | OFF | ON<br>SENSITIVITY: HIGH | ON<br>SENSITIVITY: LOW |

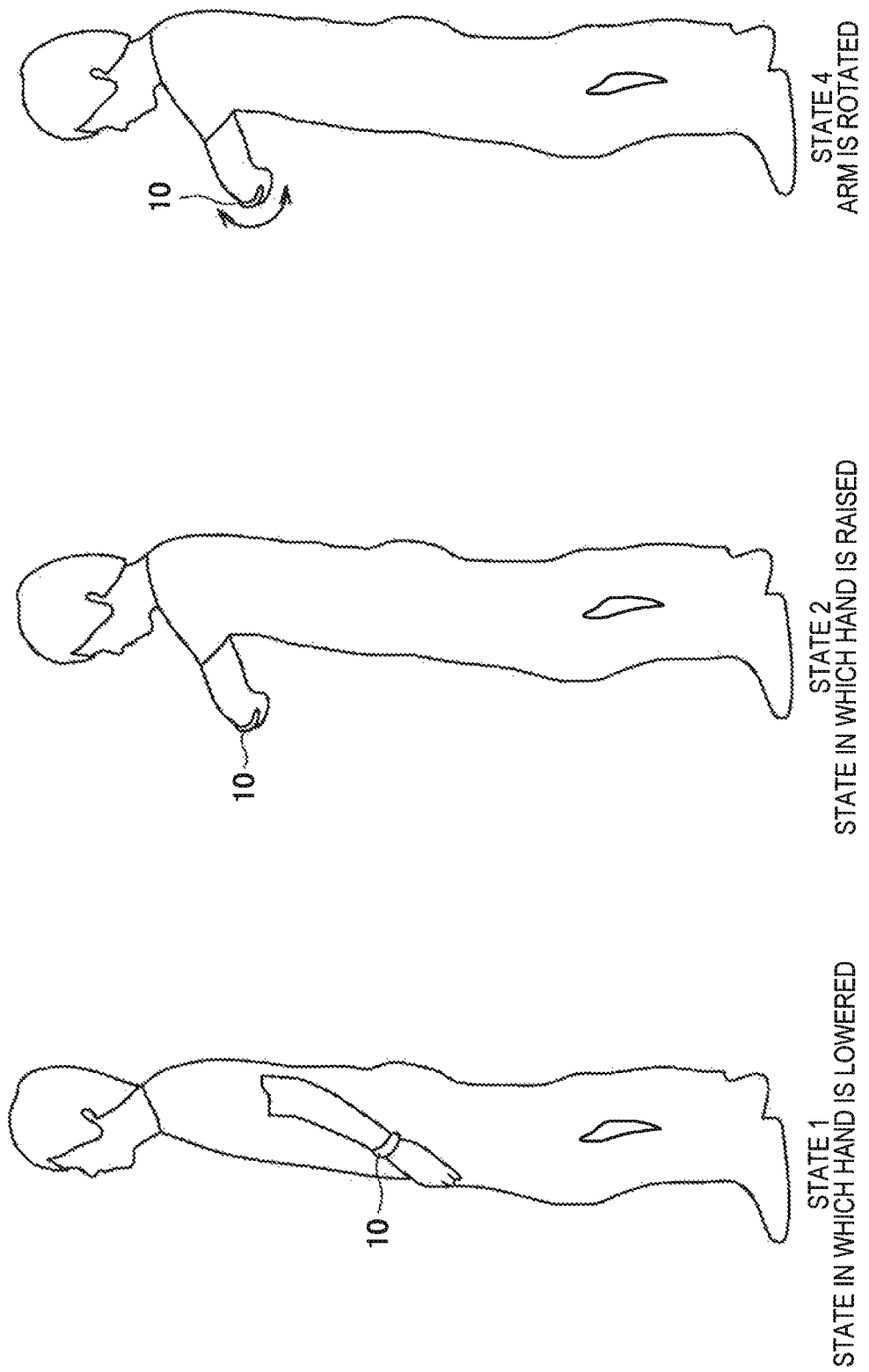

FIG. 11

| DEVICE | | | STATE 1 | STATE 2 | STATE 4 |
|---|---|---|---|---|---|
| TOUCH SENSOR | | | OFF | ON | — |
| MOTION SENSOR | ACCELERATION SENSOR | | ON<br>SAMPLING RATE: LOW | ON<br>SAMPLING RATE: HIGH | — |
| | GYROSCOPIC SENSOR | | OFF | ON | — |
| DISPLAY | | | OFF<br>(OR SIMPLE DISPLAY SUCH AS ONLY CLOCK ETC.)<br>REFRESH RATE: LOW | ON<br>REFRESH RATE: HIGH | ACCEPT AS ACTION OF "RETURNING/PROCEEDING," AND RETURN TO PREVIOUS SCREEN/PROCEED TO NEXT SCREEN |
| SPEAKER | BACK SPEAKER | | ON<br>OUTPUT: HIGH | OFF | — |
| | FRONT SPEAKER | | OFF | ON<br>OUTPUT: HIGH | — |
| MIC | | | OFF | ON<br>SENSITIVITY: HIGH | — |

FIG. 12

| DEVICE | STATE 1 | STATE 2 | STATE 4 |
|---|---|---|---|
| TOUCH SENSOR | OFF | ON | — |
| MOTION SENSOR | ON<br>SAMPLING RATE: LOW | ON<br>SAMPLING RATE: HIGH | — |
| DISPLAY | OFF<br>(OR SIMPLE DISPLAY SUCH AS ONLY CLOCK ETC.)<br>REFRESH RATE: LOW | ON<br>REFRESH RATE: HIGH | ACCEPT AS ACTION OF "RETURNING/PROCEEDING," AND RETURN TO PREVIOUS SCREEN/PROCEED TO NEXT SCREEN |
| SPEAKER | ON<br>OUTPUT: HIGH | OFF | — |
| MIC | OFF | ON<br>SENSITIVITY: HIGH | — |

FIG. 13
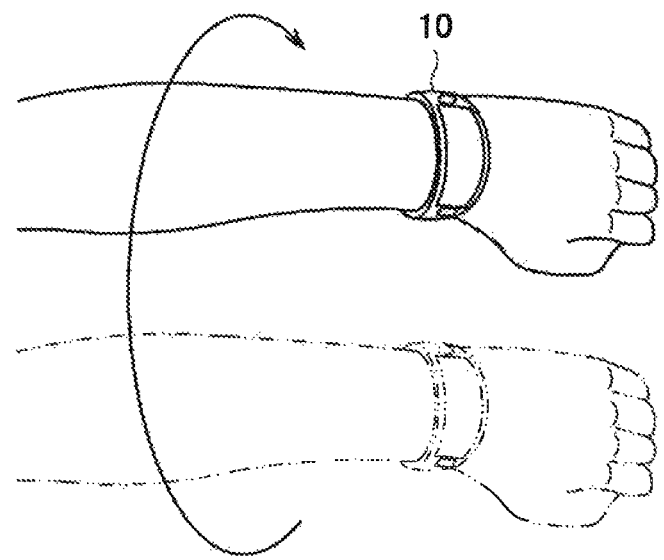
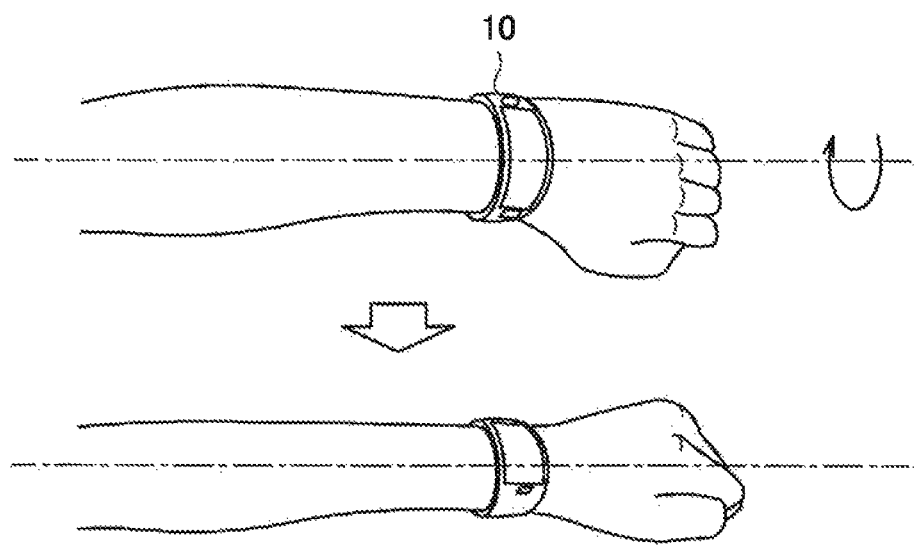

FIG. 23

| DEVICE | | | STATE 1 | STATE 2 | STATE 6 |
|---|---|---|---|---|---|
| TOUCH SENSOR | | | OFF | ON | OFF |
| MOTION SENSOR | ACCELERATION SENSOR | | ON<br>SAMPLING RATE: LOW | ON<br>SAMPLING RATE: LOW | ON<br>SAMPLING RATE: LOW |
| | GYROSCOPIC SENSOR | | OFF | ON | OFF |
| DISPLAY | | | OFF<br>(OR SIMPLE DISPLAY SUCH AS ONLY CLOCK ETC.)<br>REFRESH RATE: LOW | ON<br>REFRESH RATE: HIGH | OFF<br>(OR SIMPLE DISPLAY SUCH AS ONLY CLOCK ETC.)<br>REFRESH RATE: LOW |
| SPEAKER | BACK SPEAKER | | ON<br>OUTPUT: HIGH | OFF | OFF |
| | FRONT SPEAKER | | OFF | ON<br>OUTPUT: HIGH | OFF |
| MIC | | | OFF | ON<br>SENSITIVITY: HIGH | ON: SENSITIVITY: HIGH (DURING SHOOTING OF MOVING IMAGE)<br>OFF (DURING SHOOTING OF STILL IMAGE) |
| CAMERA | | | OFF | OFF | ON |

※ACCELERATION SENSOR AND GYROSCOPIC SENSOR MAY BE REVERSED

FIG. 24

| DEVICE | | STATE 1 | STATE 2 | STATE 6 |
|---|---|---|---|---|
| TOUCH SENSOR | | OFF | ON | OFF |
| MOTION SENSOR | | ON<br>SAMPLING RATE: LOW | ON<br>SAMPLING RATE: HIGH | ON<br>SAMPLING RATE: LOW |
| DISPLAY | | OFF<br>(OR SIMPLE DISPLAY SUCH AS ONLY CLOCK ETC.)<br>REFRESH RATE: LOW | ON<br>REFRESH RATE: HIGH | OFF<br>(OR SIMPLE DISPLAY SUCH AS ONLY CLOCK ETC.)<br>REFRESH RATE: LOW |
| SPEAKER | | ON<br>OUTPUT: HIGH | OFF | OFF |
| MIC | | OFF | ON<br>SENSITIVITY: HIGH | ON SENSITIVITY: HIGH (DURING SHOOTING OF MOVING IMAGE)<br>OFF (DURING SHOOTING OF STILL IMAGE) |
| CAMERA | | OFF | OFF | ON |

INFORMATION PROCESSING APPARATUS, CONTROL METHOD, AND PROGRAM

CROSS REFERENCE TO PRIOR APPLICATION

This application is a National Stage Patent Application of PCT International Patent Application No. PCT/JP2015/053564 (filed on Feb. 9, 2015) under 35 U.S.C. § 371, which claims priority to Japanese Patent Application No. 2014-055052 (filed on Mar. 18, 2014), which are all hereby incorporated by reference in their entirety.

TECHNICAL FIELD

The present disclosure relates to information processing apparatuses, control methods, and programs.

BACKGROUND ART

Mobile terminals that are worn on an arm like wristwatches (also hereinafter referred to as "wristband terminals") have recently been becoming widespread.

For input to wristwatch terminals for operation, a touchscreen provided at the top of the terminal is mainly used. Alternatively, for example, Patent Literature 1 below discloses a technique relating to wristwatch terminals with which gestures such as "hold," "release," and the like can be recognized and input as commands while the wristwatch terminal is worn on a wrist.

CITATION LIST

Patent Literature

Patent Literature 1: JP 2002-358149A

SUMMARY OF INVENTION

Technical Problem

However, the small size of wristwatch terminals may make it difficult to perform input operations on the touchscreen. In addition, wristwatch terminals are worn on an arm, which makes touchscreen operations unsteady compared to smartphones, which can be held by a hand.

Moreover, wristwatch terminals are worn on an arm, and therefore, it is necessary to use the other arm in order to operate the touchscreen, i.e., both arms are required for touchscreen operations. Therefore, when the other hand is occupied, the wristwatch terminal cannot be operated.

In addition, although the above conventional techniques disclose that gestures such as "hold," "release," and the like are input as commands, none of them mention that a state of an arm which is associated with the purpose of an operation (the purpose of use) is recognized. For example, during viewing of the display screen, calling, and shooting using a wristwatch terminal, an arm on which the wristwatch terminal is worn is in different states. If different intuitive input operations can be provided according to such different states, the usability of a wristwatch terminal is further improved. The detection value of a motion sensor or the like used for recognizing such arm states differs depending on whether a wristwatch terminal is worn on the user's right arm or left arm. However, in the conventional art, attention has not been paid to whether a wristwatch terminal is worn on the left arm or the right arm.

With this in mind, the present disclosure proposes an information processing apparatus, control method, and program that allow for recognition of a state of an arm on the basis of determination of whether the information processing apparatus is worn on the left arm or the right arm.

Solution to Problem

According to the present disclosure, there is provided an information processing apparatus including: a determination unit configured to determine whether the information processing apparatus is worn on a user's right arm or left arm; a recognition unit configured to recognize a state of the arm; and a control unit configured to perform predetermined control on a device included in the information processing apparatus according to the recognized state of the arm. The recognition unit switches settings of a parameter which is used in the recognition of the state of the arm, according to a result of the determination by the determination unit.

According to the present disclosure, there is provided a control method including: determining whether an information processing apparatus is worn on a user's right arm or left arm; switching settings of a parameter used in recognition of a state of the arm according to a result of the determination, and recognizing the state of the arm; and performing predetermined control on a device included in the information processing apparatus according to the recognized state of the arm.

According to the present disclosure, there is provided a program for causing a computer to function as: a determination unit configured to determine whether an information processing apparatus is worn on a user's right arm or left arm; a recognition unit configured to recognize a state of the arm; and a control unit configured to perform predetermined control on a device included in the information processing apparatus according to the recognized state of the arm. The recognition unit switches settings of a parameter which is used in the recognition of the state of the arm, according to a result of the determination by the determination unit.

Advantageous Effects of Invention

As described above, according to the present disclosure, a state of an arm can be recognized on the basis of determination of whether an information processing apparatus is worn on the left arm or the right arm.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 7 is a diagram showing a list of control of devices in states 1 to 3.

FIG. 8 is a diagram showing a list of other control of devices in states 1 to 3.

FIG. 9 is a diagram for describing state 1, state 2, and state 4.

FIG. 11 is a diagram showing a list of control of devices in state 1, state 2, and state 4.

FIG. 12 is a diagram showing a list of other control of devices in state 1, state 2, and state 4.

FIG. 13 is a diagram for describing examples of rotation of an arm.

FIG. 23 is a diagram showing a list of control of devices in state 1, state 2, and state 6.

FIG. 24 is a diagram showing a list of other control of devices in state 1, state 2, and state 6.

DESCRIPTION OF EMBODIMENT(S)

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Also, description will be provided in the following order.
1. Overview of Information processing apparatus according to Embodiment of Present Disclosure
2. Basic Configuration
3. Device Control Examples according to State
3-1. Device Control Examples in State 1, State 2, and State 3
3-2. Device Control Example in State 1, State 2, and State 4
3-3. Device Control Example during Wearing on Right Arm (State 5)
3-4. Device Control Example in State 6
4. Conclusion

1. OVERVIEW OF INFORMATION PROCESSING APPARATUS ACCORDING TO EMBODIMENT OF PRESENT DISCLOSURE

Figure 1:
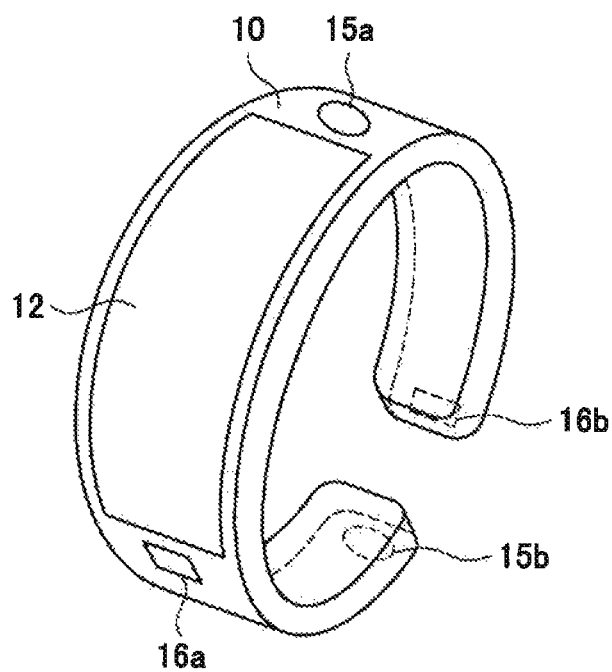
FIG. 1 is a diagram showing an external appearance and configuration of an information processing apparatus.
Figure 2:
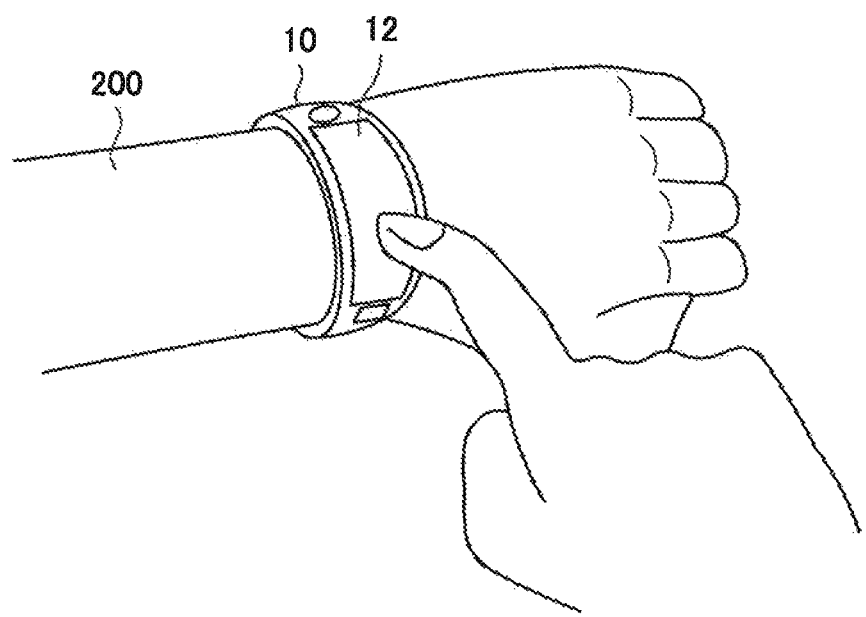
FIG. 2 is a diagram for describing an information processing apparatus as it is worn.

An overview of an information processing apparatus according to an embodiment of the present disclosure will be described with reference to FIGS. 1 and 2. FIG. 1 is a diagram showing an external appearance and configuration of the information processing apparatus. FIG. 2 is a diagram for describing the information processing apparatus as it is worn.

As shown in FIGS. 1 and 2, the information processing apparatus 10 according to this embodiment is a wearable terminal that is worn on an arm 200 or a wrist of the user, and is also referred to as a wristwatch/wristband terminal. With the information processing apparatus 10, the user can immediately check and operate information displayed on the display screen without the action of removing the information processing apparatus 10 from a bag or a pocket.

The information processing apparatus 10 is provided with, on an outer circumferential surface thereof, a touch panel display (hereinafter referred to as a touchscreen) 12 functioning as a display unit and an operation unit, speakers 15a and 15b, microphones also hereinafter referred to as mics) 16a and 16b.

The touchscreen 12 is provided in, for example, a region which is a portion of the entire circumference of the information processing apparatus 10 so that it is easy for the user to perform a touch operation on the touchscreen 12. Note that the present disclosure is not limited to this, and the touchscreen 12 may be provided along the entire circumference of the information processing apparatus 10.

The display unit function of the touchscreen 12, which is implemented by, for example, a liquid crystal display, an organic EL display, or the like, displays characters, images, and other items of information on the display screen. The display of characters, images, and other items of information is controlled by a device control unit 112 of a main control unit 11 described below.

The operation unit function of the touchscreen 12 is implemented by, for example, an operation surface which is overlaid on top of the display screen and detects a position touched by the user. The operation surface is a curved surface extending along the outer circumferential direction of the user's arm. The operation surface may include a plurality of portions having different curvatures.

It is desirable that the touchscreen 12 should have a large area so that the information processing apparatus 10 which is a wristwatch terminal can provide various functions. However, if a large touchscreen which protrudes upward or downward from the user's arm is provided, the wearability and operability of the wristwatch terminal deteriorate. Therefore, as shown in FIG. 2, the touchscreen 12 has a curved surface having a narrow width for fitting the arm 200.

As shown in FIG. 2, the user performs a touch operation on the operation surface overlaid on top of the display screen of the touchscreen 12 of the information processing apparatus 10 worn on the arm 200 while viewing the display screen.

As shown in FIGS. 1 and 2, the speakers 15a and 15b, which have the function of outputting sounds, are implemented as a front speaker and a back speaker, respectively, which are provided in the outer circumferential surface of the information processing apparatus 10. The front speaker is located near the touchscreen 12, and the back speaker is located half the circumference away from the front speaker.

As shown in FIGS. 1 and 2, the mics 16*a* and 16*b*, which have the function of collecting sounds, are implemented as a front mic and a back mic, respectively, which are provided in the outer circumferential surface of the information processing apparatus 10. The front mic is located near the touchscreen 12, and the back mic is located half the circumference away from the front mic.

Note that the numbers and positions of the speakers 15*a* and 15*b* and the mics 16*a* and 16*b* shown in FIGS. 1 and 2 are merely illustrative, and this embodiment is not limited to this. Alternatively, for example, an array speaker and an array mic may be provided along an end portion of the wristband.

(Background)

Here, as shown in FIG. 2, when an input operation is performed on the touchscreen 12 of the information processing apparatus 10 which is worn on one arm 200, the other arm is used for the input operation, and therefore, it is necessary to use both arms. Therefore, if gestures can be input by detecting motions of an arm, input operations can be performed by moving only one arm 200 on which the information processing apparatus 10 is worn, and therefore, the usability of the information processing apparatus 10 is improved.

When the information processing apparatus 10 is used to perform viewing of the display screen, calling, or shooting, the state of the arm 200 on which the information processing apparatus 10 is worn differs between these actions. If intuitive input operations can be performed according to the difference in the state, the usability of the information processing apparatus 10 is further improved.

The detection value of a motion sensor or the like used for recognizing such a state (motion) of the arm 200 differs depending on whether the information processing apparatus 10 is worn on the user's right arm or left arm.

With this in mind, in this embodiment, proposed is the information processing apparatus 10 which can recognize the state of the arm on the basis of determination of whether the information processing apparatus 10 is worn on the left arm or the right arm, and control each device in the information processing apparatus 10 according to the state of the arm.

In the foregoing, an overview of the information processing apparatus 10 according to an embodiment of the present disclosure has been described. Next, a basic configuration of the information processing apparatus 10 according to the present disclosure will be described with reference to FIG. 3.

2. BASIC CONFIGURATION

Figure 3:
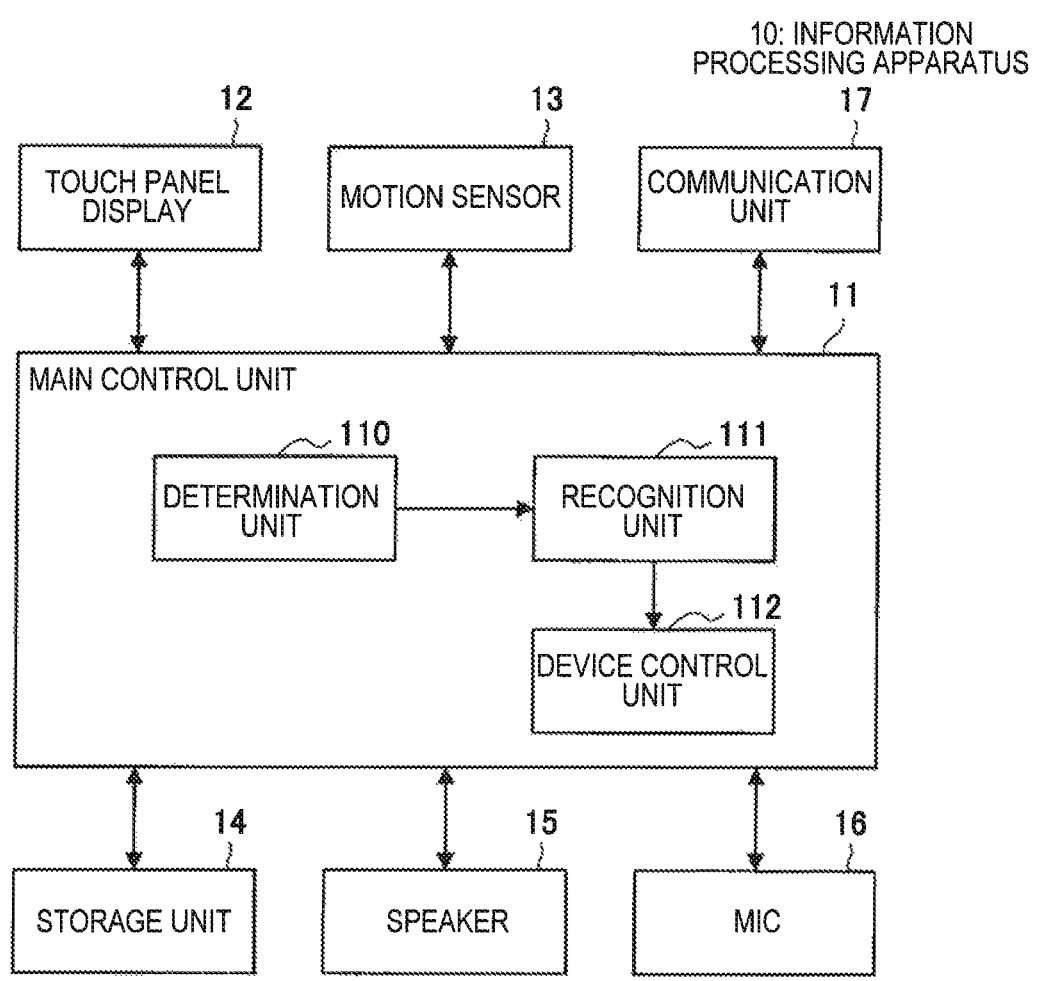
FIG. 3 is a block diagram showing a basic configuration of an information processing apparatus according to this embodiment.
Figure 10:
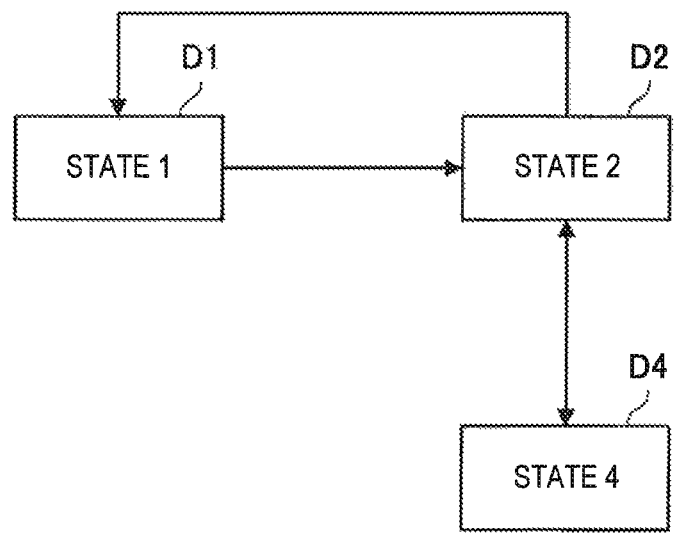
FIG. 10 is a state transition diagram showing transitions between state 1, state 2, and state 4.

FIG. 3 is a block diagram showing a basic configuration of the information processing apparatus 10 according to this embodiment. As shown in FIG. 10, the information processing apparatus 10 has a main control unit 11, a touch panel display 12, a motion sensor 13, a storage unit 14, a speaker 15, a mic 16, and a communication unit 17.

(Main Control Unit)

The main control unit 11 includes, for example, a microcomputer including a central processing unit (CPU), a read only memory (ROM), a random access memory (RAM), a non-volatile memory, and an interface unit. The main control unit 11 controls the components of the information processing apparatus 10.

The main control unit 11 according to this embodiment also functions as a determination unit 110, a recognition unit 111, and a device control unit 112. The determination unit 110 determines whether the information processing apparatus 10 is worn on the user's right arm or left arm. Specifically, for example, the determination unit 110 can determines whether the information processing apparatus 10 is worn on the user's right arm or left arm, on the basis of a detection value output from the motion sensor 13.

Figure 4:
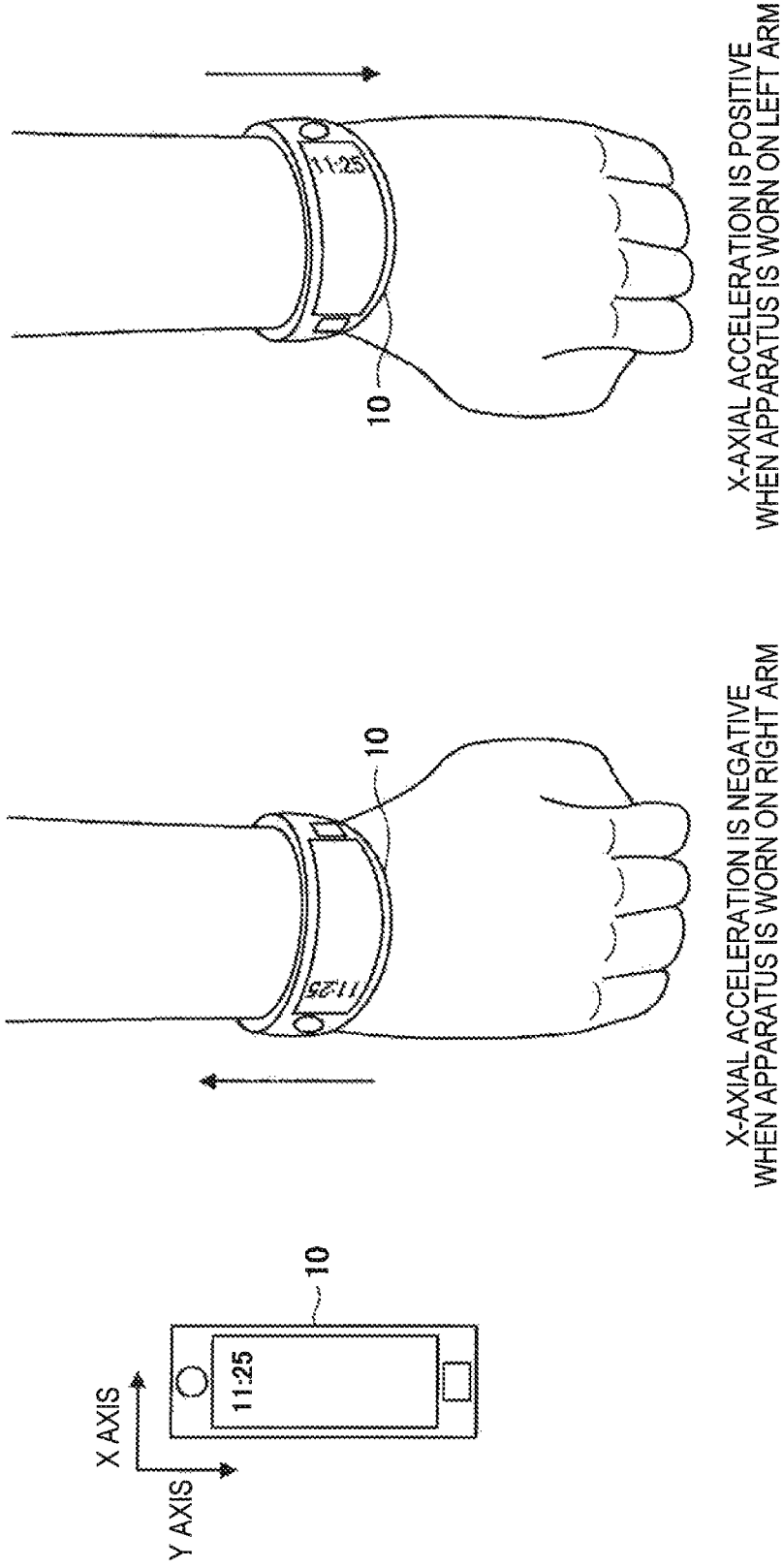
FIG. 4 is a diagram for describing determination of whether an information processing apparatus is worn on the right arm or the left arm, which is performed using an acceleration sensor.

Here, the determination of whether the information processing apparatus 10 is worn on the user's right arm or left arm, which is performed by the determination unit 110, will be described with reference to FIG. 4. FIG. 4 is a diagram for describing the determination of whether the information processing apparatus 10 is worn on the user's right arm or left arm, which is performed using an acceleration sensor. Here, an acceleration sensor is used as an example of the motion sensor 13 provided in the information processing apparatus 10. For example, as shown in FIG. 4, the information processing apparatus 10 is worn on a wrist in a position that allows the wearer to properly view the display screen, and the orientation of the acceleration sensor is set so that an acceleration in the X-axis direction is negative when the information processing apparatus 10 is worn on the right arm, and positive when the information processing apparatus 10 is worn on the left arm, where the arm on which the information processing apparatus 10 is worn points downward.

When the orientation of the acceleration sensor is known, the determination unit 110 can determine that the information processing apparatus 10 is worn on the right arm if the acceleration in the X-axis direction is negative, and that the information processing apparatus 10 is worn on the left arm if the acceleration in the X-axis direction is positive, on the basis of the detection value of the acceleration sensor that is obtained when the arm points downward.

The determination unit 110 outputs the determination result to the recognition unit 111. Note that the determination unit 110 can determine whether the information processing apparatus 10 is worn on the left arm or the right arm, on the basis of mechanical learning or the user's input, in addition to the automatic determination of whether the information processing apparatus 10 is worn on the left arm or the right arm, on the basis of the detection value from the motion sensor 13. For example, when the orientation of the acceleration sensor is not known, the determination unit 110 extracts patterns by sampling detection values that are continuously output from the motion sensor 13 (e.g., an acceleration sensor), and performs matching between the extracted patterns and training data (patterns of motions (states) of the right arm and the left arm) for machine learning, and determines whether the information processing apparatus 10 is worn on the left arm or the right arm. Alternatively, when the user inputs, from the touchscreen 12, information indicating whether the information processing apparatus 10 is worn on the left arm or the right arm, or when the user inputs such information using their voice through the mic 16, the determination unit 110 determines whether the information processing apparatus 10 is worn on the left arm or the right arm, on the basis of the input information.

The recognition unit 111 has the function of recognizing the state of the arm 200 worn on the information processing apparatus 10. Specifically, for example, the recognition unit 111 recognizes the state (motion) of the arm on the basis of a detection value output from the motion sensor 13. The recognition unit 111 can also switch settings of a parameter which is used in recognition of the state of the arm, according to the result of the determination performed by the determination unit 110, and thereby more correctly recognize the state of the arm even the motion is complicated. For example, the sign of a detection value output from the acceleration sensor which is an example of the motion sensor 13 changes depending on whether the information processing apparatus 10 is worn on the left arm or the right arm. Therefore, if the sign of the parameter is switched according to whether the information processing apparatus 10 is worn on the left arm or the right arm, the recognition unit 111 can more correctly recognize the state of the arm. Note that variations of the state of the arm recognized by the recognition unit 111 will be specifically described in "3. Device Control Examples according to State" below. The recognition unit 111 also sends the recognition result to the device control unit 112.

The device control unit 112 has the function of performing predetermined control on various devices provided in the information processing apparatus 10 according to the state of the arm recognized by the recognition unit 111. For example, the device control unit 112 switches on/off, changes settings, and the like, with respect to various devices such as the display unit and operation unit of the touchscreen 12, the motion sensor 13, the speaker 15, and the mic 16. As described in "3. Device Control Examples according to State" below, the purpose of use (user context) of the information processing apparatus 10 which is a wristwatch terminal having a number of functions is estimated on the basis of the state of the arm recognized by the basis of the recognition unit ill. Therefore, the device control unit 112 performs device control according to the estimated purpose of use. Specifically, for example, the device control unit 112 switches on a device required for the estimated purpose of use, changes the setting of a performance rate of an output/input device when necessary, or switches off a device not required.

As a result, the user can perform device control according to the purpose of use only by moving the arm 200 without bothering to perform an input operation on the touchscreen 12. Specifically, by causing the information processing apparatus 10 to recognize the motion of the arm which varies depending on the purpose of use such as viewing of the display screen, calling, or shooting, and recognize the motion as a gesture command, the switching on and off of various devices can be automatically controlled only by a more natural motion of the user.

(Touch Panel Display)

As described above, the touch panel display 12 functions as a display unit and an operation unit (e.g., a touch sensor).

(Motion Sensor)

The motion sensor 13, which is a sensor for detecting the state (motion) of the arm 200 on which the information processing apparatus 10 is worn, is implemented by a device for detecting a spatial motion or angle, such as an acceleration sensor, a gyroscopic sensor, a geomagnetic sensor, or the like. Alternatively, the motion sensor 13 may include a combination of different sensors.

Note that when a method of determining a physical state of a device using a short-range sensor included in the device itself, which method is, for example, employed in smartphones, is applied to a wristwatch terminal, it is necessary to hold the information processing apparatus 10 as close to an ear as possible so that the short-range sensor can recognize a state of the information processing apparatus 10 held close to the ear, such as state 3 which will be described below with reference to FIG. 5. However, such a motion is unnatural, which causes physical load on the user. With this in mind, in this embodiment, a motion sensor is used to recognize the state of the arm so that the state can be recognized while a natural motion is performed without putting the body in an unnatural position.

(Communication Unit)

The communication unit 17 has the function of connecting to an external apparatus and exchanging data with the external apparatus. For example, the communication unit 17 may connect to a smartphone carried by the user and exchange data with the smartphone, or may connect to a predetermined server through a network and exchange data with the server. Alternatively, the communication unit 17 may communicate audio signals through a mobile telephone network or the Internet network.

(Storage Unit)

The storage unit 14 stores a program or the like for execution of various processes performed by the main control unit 11. For example, the storage unit 14 stores data related to predetermined control of various devices which is performed by the device control unit 112 according to the recognized state.

(Speaker)

The speaker 15 has the function of outputting sounds (audio signal). For example, the speaker 15 sounds the alarm to the user, or outputs received voice during a conversation.

(Mic)

The mic 16 has the function of collecting sounds (audio signal). For example, the mic 16 receives the user's voice input, or collects the user's voice uttered during a conversation.

In the foregoing, a configuration of the information processing apparatus 10 according to this embodiment has been described in detail. Next, device control examples according to a state of the information processing apparatus 10 will be described using a plurality of specific examples.

3. DEVICE CONTROL EXAMPLES ACCORDING TO STATE

3-1. Device Control Examples in State 1, State 2, and State 3

Firstly, device control examples in states 1 to 3 will be described with reference to FIGS. 5 to 8. FIG. 5 is a diagram for describing states 1 to 3. State 1 shown on the left side of FIG. 5 illustrates a state in which an arm (hand) on which the information processing apparatus 10 is worn is lowered. State 2 shown on the middle of FIG. 5 illustrates a state in which an arm (hand) is positioned in front of a lower portion of the body (a state in which the arm is raised in order to view the display screen of the information processing apparatus 10). State 3 illustrates a state in which the arm (hand) is held close to an ear (a state in which calling is being performed with the back speaker 15b and the rear mic 16b (the anterior side of a wrist) being held close to the face).

The recognition unit 111 of the information processing apparatus 10 can recognize states 1 to 3 on the basis of a detection value from the motion sensor 13 provided in the information processing apparatus 10.

Figure 6:
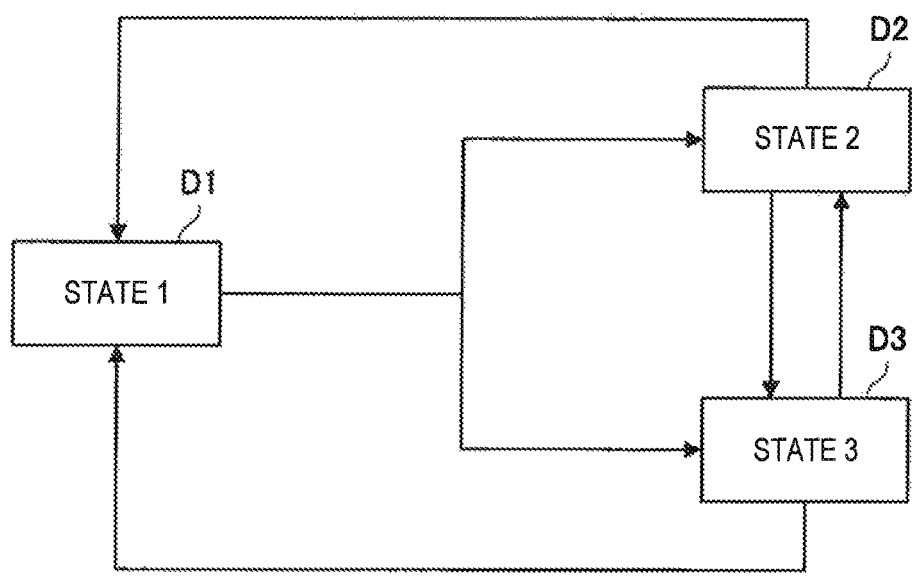
FIG. 6 is a state transition diagram showing transitions between states 1 to 3.

FIG. 6 is a state transition diagram showing transitions between states 1 to 3. As shown in FIG. 6, a transition can occur from state 1 (D1) in which the arm is lowered to state 2 (D2) in which the arm is raised, and vice versa. A transition can occur from state 1 (D1) in which the arm is lowered to state 3 (D3) in which the arm is held close to an ear, and vice versa. A transition can occur from state 2 (D2) in which the arm is raised to state 3 (D3) in which the arm is held close to an ear, and vice versa.

The recognition unit 111 of the information processing apparatus 10 recognizes the current state on the basis of a detection value from the motion sensor 13, and outputs the recognition result to the device control unit 112. A transition can occur between states 1 to 3 as shown in FIG. 6, and therefore, the recognition unit 111 can recognize the current state in real time on the basis of detection values continuously output from the motion sensor 13.

Thereafter, the device control unit 112 performs predetermined control on each device according to the recognized state. For each state, the device control unit 112 can turn off the function of a device which is not to be used in the state to reduce power consumption, and turn on the function of a device which is to be used in the state without bothering to perform an operation to turn on (e.g., an explicit operation on the touchscreen 12), so that the function of a required device can be exhibited when necessary.

Here, each of the device control examples according to the state will be described with reference to FIG. 7. FIG. 7 is a diagram showing a list of control of devices in states 1 to 3. Here, examples of the devices include a "touch sensor" corresponding to an operation unit included in the touchscreen 12, an "acceleration sensor" and a "gyroscopic sensor" implemented as the motion sensor 13, and a "display" corresponding to the display unit included in the touchscreen 12. Examples of the devices also include a "back speaker" corresponding to the speaker 15b, a "front speaker" corresponding to the speaker 15a, and "mics" corresponding to the mics 16a and 16b.

3-1-1. Device Control in State 1

As shown in FIG. 7, for example, it is assumed that a touch operation is not performed in state 1 in which the arm is lowered, and therefore, the touch sensor is controlled to be off. When the motion sensor 13 includes a plurality of sensors e.g., an acceleration sensor and a gyroscopic sensor), one of the sensors is on while the other sensor is off. If the sensor which is on is controlled so that the sampling rate is low, power consumption can be reduced. The sampling rate may be as low as a transition from state 1 to state 2 or state 3 can be detected. Although, in the example shown in FIG. 7, the gyroscopic sensor is off while the acceleration sensor is on, because the gyroscopic sensor consumes more power, this embodiment is not limited to this. The opposite of the above control is possible.

In state 1, the display is controlled to be off because it is assumed that the display is not viewed. Alternatively, the display is controlled to simply display only a clock or the like. In addition, it is assumed that the user is not viewing the display, and therefore, the refresh rate (screen updating rate) is controlled to be low. Thus, the power consumption of the display is reduced when the display is not used.

State 1 is also considered as a state in which an incoming call or mail is waited for. Therefore, in state 1, when a call or a mail is received, it is necessary to notify the user of the reception of a call or a mail, and therefore, at least one of the front speaker 15a and the back speaker 15b is controlled to be on. In addition, in order to notify the user, the output is controlled to be high (loud sound). Note that the user may be notified of a call or a mail by vibrations. In this case, all the speakers are controlled to be off, and a vibration unit (not shown) is control to be on. In state 1, it is also not assumed that the mic is used, and therefore, the mic is controlled to be off.

3-1-2. Device Control in State 2

Next, when there is an incoming call or mail in state 1, the user raises and holds the arm in front of the user's body while causing the display screen of the information processing apparatus 10 faces the user so that the user can view the display screen, which is state 2. At this time, the recognition unit 111 recognizes a transition from state 1 to state 2, and outputs the recognition result to the device control unit 112. The device control unit 112 performs predetermined control on each device in response to the transition to state 2.

Specifically, as shown in FIG. 7, in state 2 in which the arm is raised and a held in front of the body, it is assumed that a touch operation is performed, and therefore, the touch sensor is controlled to be on. The motion sensor 13 is controlled as in state 1. When a plurality of sensors are included, one of the sensors is on while the other sensor is off. The sensor which is on is controlled so that the sampling rate is low, whereby power consumption is reduced. The sampling rate may be as low as a transition from state 1 to state 2 or state 3 can be detected.

In state 2, it is assumed that the display is viewed, and therefore, the display is controlled to be on. It is also assumed that the user is viewing the display, and therefore, the refresh rate (screen updating rate) is controlled to be high. The display shows, for example, the name of a mail sender, the title of a mail, or the name of a caller, the number of a call, or the like.

In state 2, it is also assumed that a conversation is continued after a transition from the state 3, and therefore, the front speaker 15a is controlled to be on, and the output is controlled to be high (loud sound). As a result, even when the information processing apparatus 10 is away from the ear of state 3, the user can continue a conversation.

When a conversation is continued, it is assumed that the mic is used. Therefore, in state 2, the mic is controlled to be on. Alternatively, it is also assumed that the user who has confirmed a mail sender or a caller on the display may answer using an audio input. Therefore, in state 2, the mic is controlled to be on. In this case, the mic is away from the user's face, and therefore, the sensitivity of the mic is controlled to be high.

3-1-3. Device Control in State 3

Figure 5:
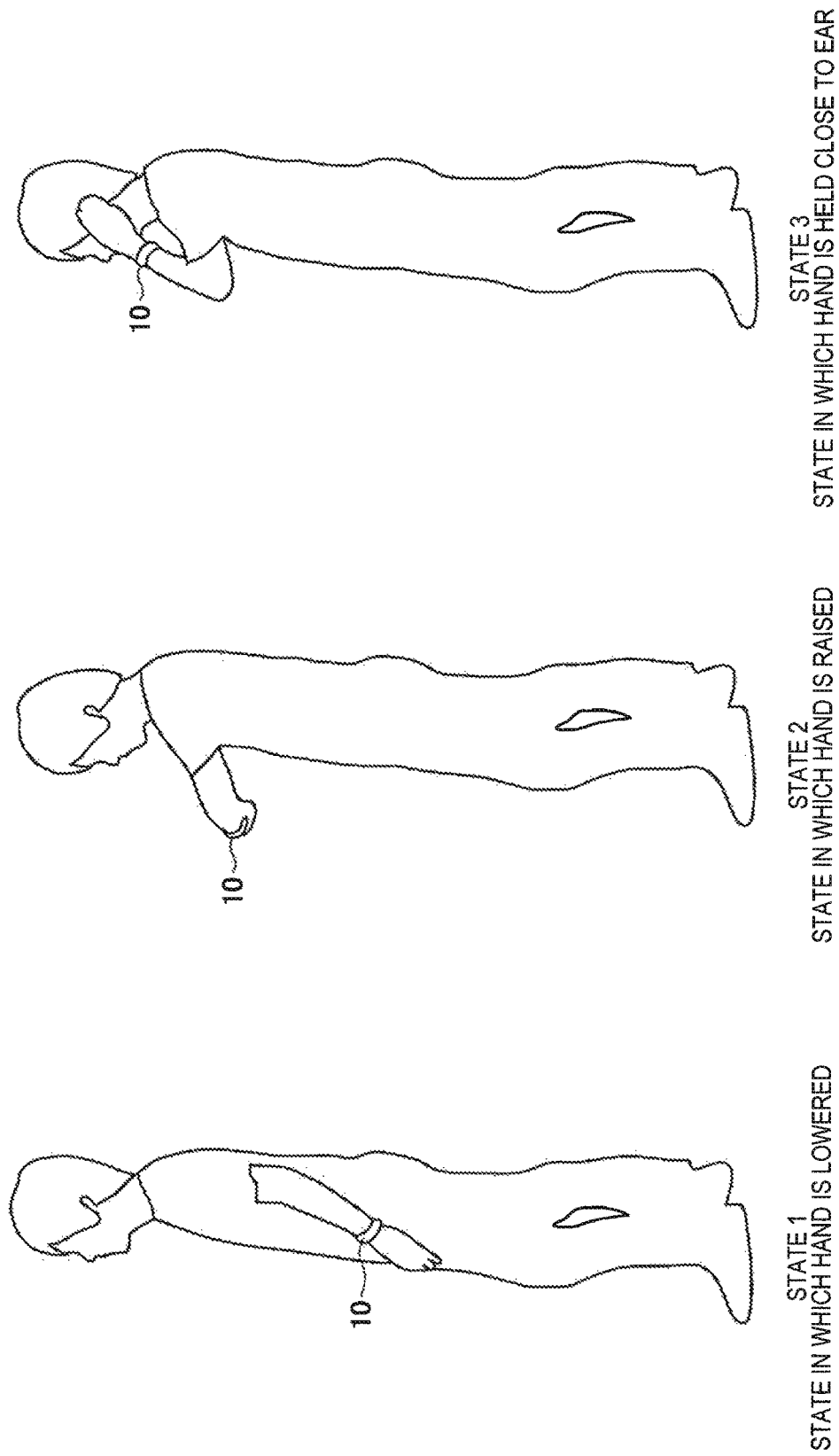
FIG. 5 is a diagram for describing states 1 to 3.

Next, when, in state 2, the user confirms a caller and then answers the call, the user raises the arm and moves the anterior side of the wrist to near the face while still holding the information processing apparatus 10, and holds the hand close to an ear, i.e., a transition occurs from state 2 to state 3 (see FIG. 5). At this time, the recognition unit 111 recognizes the transition from state 2 to state 3, and outputs the recognition result to the device control unit 112. The device control unit 112 performs predetermined control on each device in response to the transition to state 3.

Specifically, as shown in FIG. 7, in state 3 in which the hand is held close to an ear, it is assumed that a touch operation is not performed, and therefore, the touch sensor is controlled to be off as in state 1. The motion sensor 13 is also controlled as in state 1. When the motion sensor 13 includes a plurality of sensors, one of the sensors is on while the other sensor is off. The sensor which is on is controlled so that the sampling rate is low, whereby power consumption is reduced. The sampling rate may be as low as a transition from state 3 to state 1 or state 2 can be detected.

Also, in state 3, it is assumed that the display is not viewed, and therefore, the display is controlled to be off as in state 1. Alternatively, the display is controlled to simply display only a clock or the like. In addition, it is assumed that the user is not viewing the display, and therefore, the refresh rate (screen updating rate) is controlled to be low.

Also, a transition from state 2 to state 3 corresponds to a gesture answering a call, and therefore, the back speaker 15b, which is located on the anterior side of a wrist facing the face, is controlled to be on, and is control to reduce the output (low sound) because the back speaker 15 is located close to an ear. Also, the device control unit 112 performs control so that received voice is output from the back speaker 15b. As a result, the transition from state 2 to state 3, which corresponds to a motion for having a conversation, is simultaneously recognized as a gesture command for answering a call. Therefore, the user can start a conversation without performing a touch operation or the like.

Also, in state 3 in which the user answers a call, the mic is controlled to be on, and is controlled to be less sensitive because the mic is close in distance to the face. The device control unit 112 performs control so that the user's voice collected by the mic is transmitted to an information processing terminal of the other side of the call through the communication unit 17.

In the foregoing, device controls in states 1 to 3 have been described. Note that after the user is notified of an incoming call and then a transition to state 2 occurs, the user may cheek the display, and then lower the arm, so that a transition to state 1 occurs, which is recognized as a gesture command indicating that the user does not answer the call. In this case, the device control unit 112 sends, for example, a message that "I can't answer your call right now" to an information processing terminal of the other side of the call, and ends communication.

Also, a transition to state 3 may occur, in which the user answers a call, and thereafter, a transition to state 2 may occur during a conversation. In this case, it is assumed that the user desires to check the display while continuing a conversation. Therefore, the device control unit 112 performs control so that the output of the speaker is increased, and the display and the touch sensor are controlled to be on. Also, the device control unit 112 increases the sensitivity of the mic so that the mic can collect the user's voice irrespective of the information processing apparatus 10 being away from the face.

When the state of the arm returns to state 3 in which the hand is held close to an ear after the user has finished checking information on the display, the device control unit 112 performs control so that the display is controlled to be off again and the output of the speaker is decreased.

Thereafter, when a transition occurs from state 3 to state 1, the device control unit 112 recognizes such a transition as a gesture command for ending the call, and performs control so that the call is ended.

Thus, according to this embodiment, when the user only performs an action corresponding to a user context, the control of each device is optimized so that it is not necessary for the user to perform other operations (e.g., tapping the screen, operating a hardware key, etc.), resulting in an improvement in operability and usability. Examples of an action corresponding to a user context include the action of viewing the touchscreen 12 in order to check an incoming call/mail if notified of any, the action of holding the information processing apparatus 10 close to an ear when it is necessary to have a conversation.

Note that the device control shown in FIG. 7 is merely illustrative, and this embodiment is not limited to this. For example, only a single motion sensor may be provided, and only a single speaker may be provided. In this case, device control corresponding to each state is performed as shown in FIG. 8, for example. FIG. 8 is a diagram showing a list of other control of devices in states 1 to 3.

In FIG. 8, when only a single motion sensor is used, the motion sensor is controlled to be on, and the sampling rate is set to low, in all states 1 to 3.

Also, when only a single speaker is used, the speaker is controlled to be on, and the output is set to high, in state 1. In state 2, the speaker is controlled to be off. In state 3, the speaker is controlled to be on, and the output is set to low. When only a single speaker is used, the position where the speaker is placed is not particularly limited.

3-2. Device Control Examples in State 1, State 2, and State 4

Next, other gesture inputs in state 2 will be described with reference to FIGS. 9 to 12. FIG. 9 is a diagram for describing state 1, state 2, and state 4. State 1 shown on the left side of FIG. 9 and state 2 shown in the middle of FIG. 9 are similar to those described with reference to FIG. 5.

State 4 shown on the right side of FIG. 9 illustrates a state in which the arm (hand) is rotated while the arm is held in front of a lower portion of the body (a state in which the arm is raised in order to view the display screen of the information processing apparatus 10).

The recognition unit 111 of the information processing apparatus 10 can recognize state 1, state 2, and state 4 on the basis of detection values from the motion sensor 13 provided in the information processing apparatus 10.

FIG. 10 is a state transition diagram showing transitions between state 1, state 2, and state 4. As shown in FIG. 10, a transition can occur from state 1 (D1) in which the arm is lowered to state 2 (D2) in which the arm is raised in front of the body, and vice versa. A transition can occur from state 2 (D2) in which the arm is raised in front of the body to state 4 (D4) in which the arm is rotated in front of the body, and vice versa.

State 4 results from a transition from state 2. Therefore, it is assumed that state 4 corresponds to an action which is performed during the occurrence of a user context in which the user desires to view the next screen or the previous screen while the user is viewing the display screen of the information processing apparatus 10 in state 2. With this in mind, in this embodiment, control is performed so that screen transition of the touchscreen 12 occurs according to a state of rotation of the arm (rotation toward or away from the body).

FIG. 11 is a diagram showing a list of control of devices in state 1, state 2, and state 4. The control of each device in state 1 has been described above with reference to FIG. 7 and therefore will not be here described.

Of the control of devices in state 2, the control of a motion sensor is different from that shown in FIG. 7, i.e., the sampling data is set to high. In this embodiment, a transition may occur from state 2 to state 4, and it is necessary to correctly detect a complicated motion such as a rotation of the arm, and therefore, the detection level of the motion sensor is increased when a transition to state 2 has occurred. Note that, in this case, while the sampling rate of the acceleration sensor remains low, the gyroscopic sensor may be controlled to be on. Also, the control of other devices in state 2 is similar to that of the example shown in FIG. 7.

In state 4, as shown in FIG. 11, the action of rotating the arm (rotation toward or away from the body) is accepted as the action of "returning" or "proceeding," and the device control unit 112 controls the display so that the display returns to the immediately previous screen or proceeds to the next screen. Note that control for state 2 is maintained for the devices other than the display (specifically, the touch sensor, the motion sensor, the speaker, and the mic).

Thus, according to this embodiment, the user can change display screens only by rotating their arm on which the information processing apparatus 10 is worn, without performing an input operation on the touchscreen.

(Supplement 1)

Note that the device control shown in FIG. 11 is merely illustrative, and this embodiment is not limited to this. For example, only a single motion sensor may be provided, and only a single speaker may be provided. In this case, the device control is performed according to states as shown in FIG. 12, for example. FIG. 12 is a diagram showing a list of other control of devices in state 1, state 2, and state 4.

As shown in FIG. 12, in state 4, the action of rotating the arm (rotation toward or away from the body) is accepted as the action of "returning" or "proceeding," and the device control unit 112 controls the display so that the display returns to the immediately previous screen or proceeds to the next screen, as in the case shown in FIG. 11. Note that control for state 2 is maintained for the devices other than the display (specifically, the touch sensor, the motion sensor, the speaker, and the mic).

(Supplement 2)

Also, a user context which varies depending on the rotation of the arm may be recognized. This will now be described with reference to FIG. 13.

FIG. 13 is a diagram for describing examples of the rotation of the arm. As shown in the top of FIG. 13, the action of largely moving the arm toward or away from the body corresponds to the rotation of the arm in state 4 shown on the right side of FIG. 9, which causes the device control unit 112 to change screens.

Meanwhile, as shown in the bottom of FIG. 13, the action of twisting the arm (wrist) may be recognized by the recognition unit 111. In this case, the device control unit 112 can perform volume control by controlling the output of the speaker according to the direction or degree in or to which the arm is twisted, for example. For example, when a transition occurs from state 3 to state 2, the user checks the display while continuing a conversation, and therefore, the output of the speaker is controlled to be high. In this case, it may be desirable to adjust the output of the speaker (the amount of sound) according to the time or the place.

3-3. Device Control Example During Wearing on Right Arm (State 5)

Figure 14:
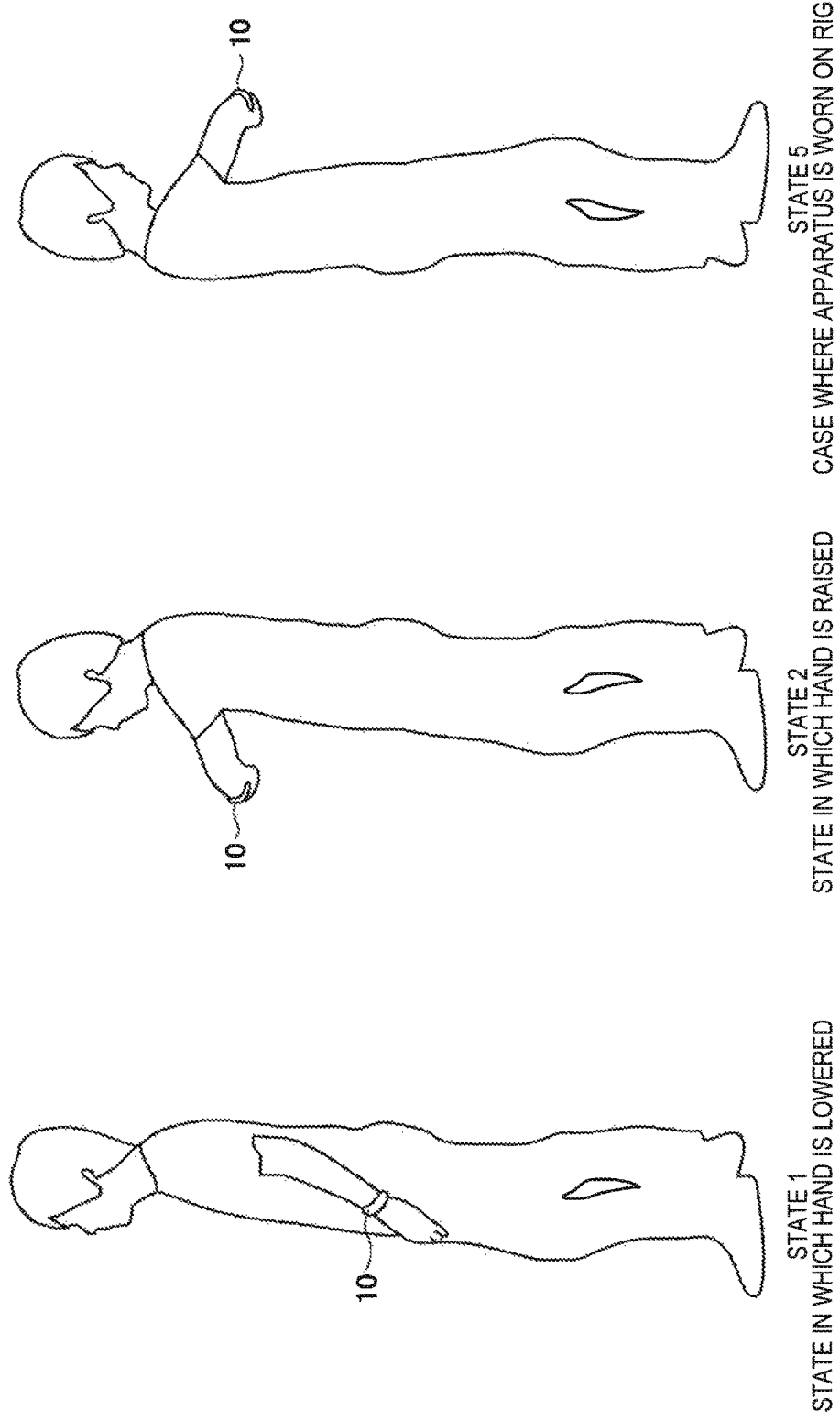
FIG. 14 is a diagram for describing state 1, state 2, and state 5.

Next, a device control example according to whether the information processing apparatus 10 is worn on the left arm or the right arm will be described with reference to FIGS. 14 to 20. FIG. 14 is a diagram for describing state 1, state 2, and state 5. State 1 shown on the left side of FIG. 14, and state 2 shown in the middle of FIG. 14, are similar to those described with reference to FIG. 5, in both of which the information processing apparatus 10 is worn on the left arm.

Meanwhile, state 5 shown on the right side of FIG. 14 is a state in which the information processing apparatus 10 is worn on the right arm, and the right arm is held in front of a lower portion of the body (a state in which the right arm is raised in order to view the display screen of the information processing apparatus 10).

The decision on whether the information processing apparatus 10 is worn on the left arm or the right arm differs from person to person. However, for example, if operations on the touchscreen 12 are taken into consideration, it is assumed that the information processing apparatus 10 is worn on the arm of the non-dominant hand, and the dominant hand is used to operate the touchscreen 12.

In this case, for example, when a right-handed person wears the information processing apparatus 10 on their left arm, and operates the touchscreen 12 using the right hand in state 2 shown in FIG. 14, conventional display control in which the arm on which the information processing apparatus 10 is worn is not taken into consideration raises the following problems.

Figure 15:
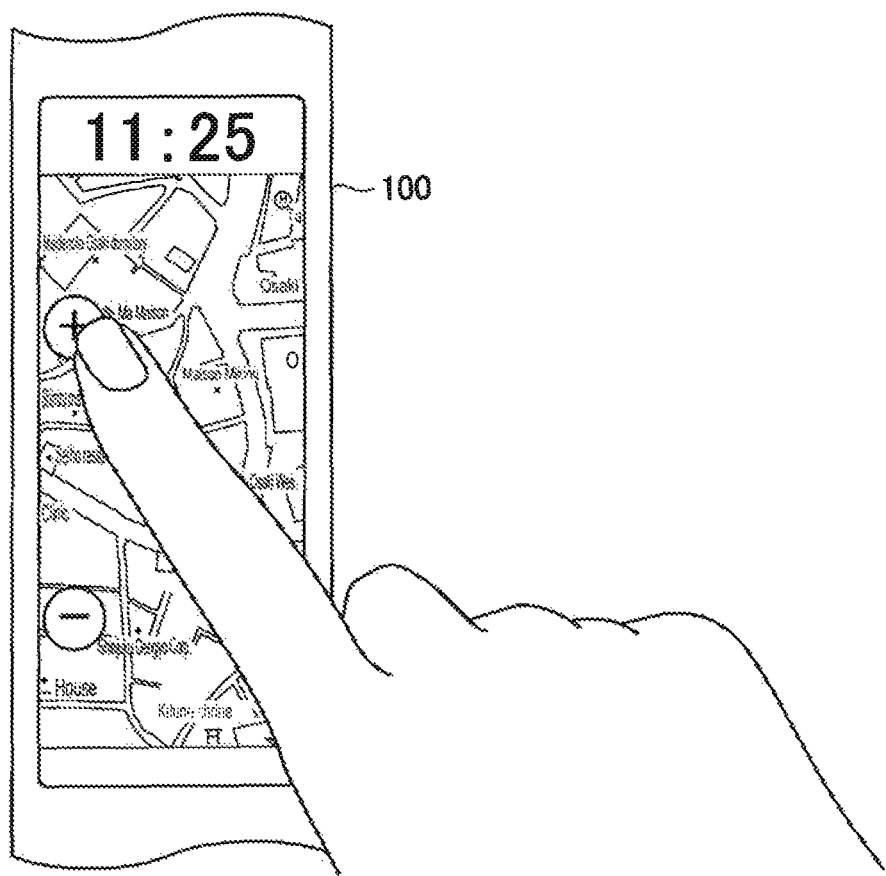
FIG. 15 is a diagram showing a display screen example of an information processing apparatus according to a comparative example.

FIG. 15 is a diagram showing a display screen example of an information processing apparatus 100 according to a comparative example. As shown in FIG. 15, when the information processing apparatus 100 which is a wristwatch terminal is worn on the left arm and is operated using the right arm, then if a command system is displayed on the left side of the screen, the screen is hidden by the right hand as it is being used for operation, because the area of the touchscreen is small (a curved surface having a narrow width for fitting an arm).

With this in mind, in this embodiment, the display is allowed to be controlled in different ways according to whether the information processing apparatus 10 is worn on the left arm or the right arm (state 2/state 5). This will now be specifically described with reference to FIGS. 16 and 17.

Figure 16:
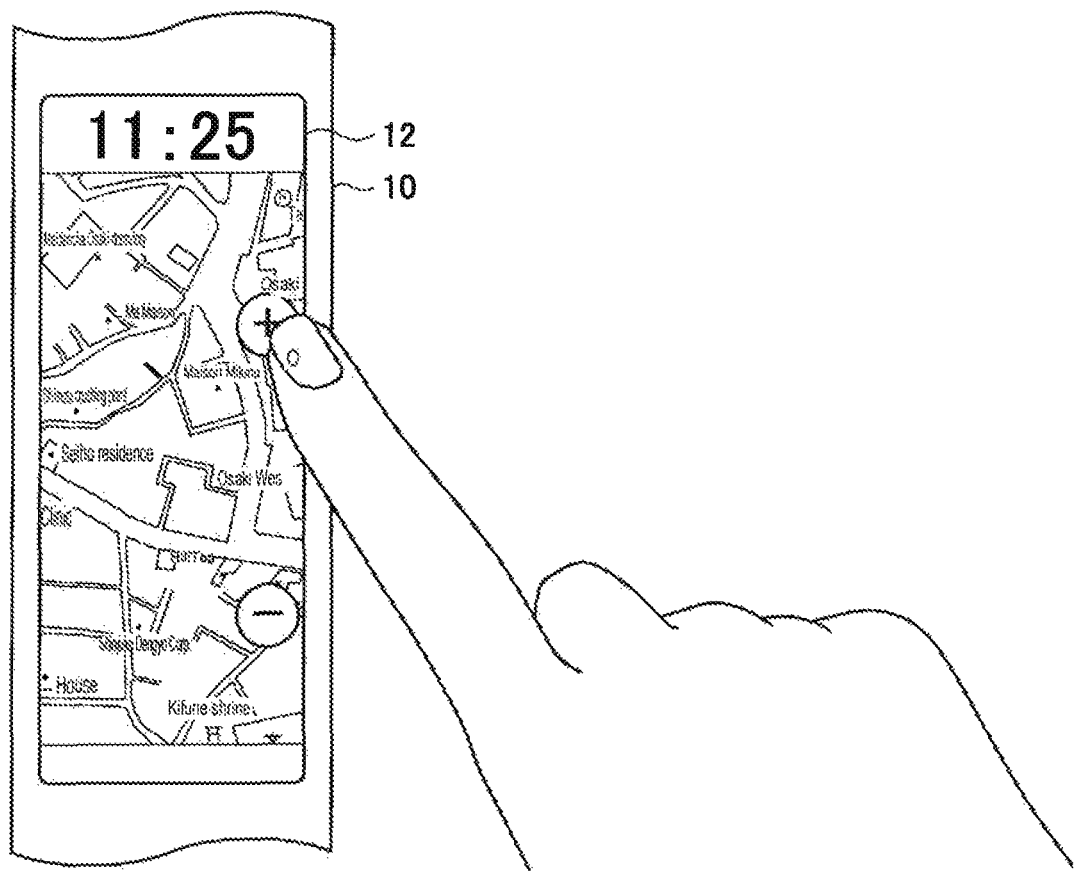
FIG. 16 is a diagram showing a display screen example where an information processing apparatus according to this embodiment is worn on the left arm.

FIG. 16 is a diagram showing a display screen example where the information processing apparatus 10 according to this embodiment is worn on the left arm. As shown in FIG. 16, when it is determined that the information processing apparatus 10 which is a wristwatch terminal is worn on the left arm (state 2 shown in FIG. 14), then if the information processing apparatus 10 is controlled so that a command system is displayed on the right side of the screen (the touchscreen 12), the situation that the screen is hidden by the user's right hand as it is being used to touch the command system, can be avoided.

Figure 17:
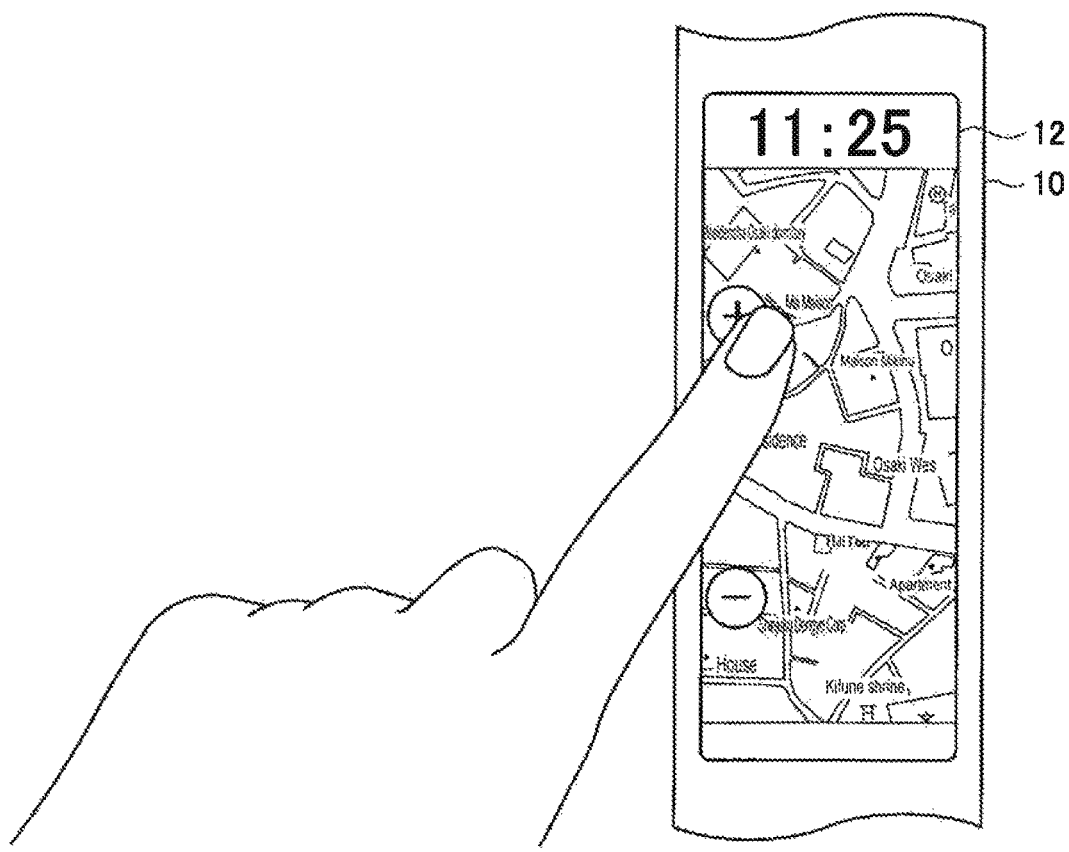
FIG. 17 is a diagram showing a display screen example where an information processing apparatus according to this embodiment is worn on the right arm.

FIG. 17 is a diagram showing a display screen example where the information processing apparatus 10 according to this embodiment is worn on the right arm. As shown in FIG. 17, when it is determined that the information processing apparatus 10 which is a wristwatch terminal is worn on the right arm (state 5 shown in FIG. 14), then if the information processing apparatus 10 is controlled so that a command system is displayed on the left side of the screen (the touchscreen 12), the situation that the screen is hidden by the user's left hand as it is being used to touch the command system, can be avoided.

As described above, in this embodiment, the display is switched according to whether the information processing apparatus 10 is worn on the left arm or the right arm, whereby the usability of the information processing apparatus 10 can be further improved. Note that the device control which is switched in state 2, according to whether the information processing apparatus 10 is worn on the left arm or the right arm, is not limited to the above display control. For example, the control of the touch sensor may be switched according to whether the information processing apparatus 10 is worn on the left arm or the right arm. This will now be specifically described with reference to FIGS. 18 to 20.

(Right and Left Switching Control of Touch Sensor)

Figure 18:
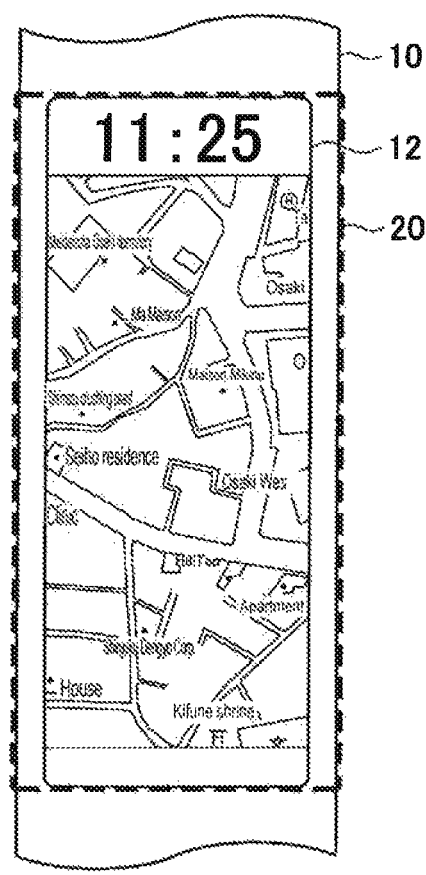
FIG. 18 is a diagram for describing a detectable region of a touch sensor.

FIG. 18 is a diagram for describing a detectable region of the touch sensor. As shown in FIG. 18, the information processing apparatus 10 according to this embodiment may be configured to have an operable region 20 of the touch sensor outside the region of the touch panel display 12 on which a screen, such as a map or the like, is displayed. In this case, the user can perform a zooming operation on a screen, such as a map or the like, using a region outside the screen region. Specifically, the main control unit 11 of the information processing apparatus 10 provides a touch detection region to the left and right of the screen region, and assigns a screen zooming operation to this region.

Here, the information processing apparatus 10 which is a wristwatch terminal has a small screen region, taking into consideration the portability of the information processing apparatus 10 worn on an arm. Therefore, the small screen region is not suitable for operations using a plurality of fingers, such as pinch and depinch. A method for performing a zooming operation using command buttons as shown in FIG. 16 is suitable for the small screen region. However, a problem arises that a portion of the display screen is hidden by the command buttons. Therefore, if a touch detection region is provided to the left and right of the screen region, an operation method suitable for a zooming operation can be provided. For example, zooming in/out can be performed by dragging vertically outside the screen region.

At this time, it is necessary to avoid the problem that a hand being used for operation overlaps the screen, as in the case of the above operation described using the comparative example shown in FIG. 15. With this in mind, in this embodiment, control is performed to determine which of the left and right touch detection regions outside the screen region is assigned a zooming operation, on the basis of whether the information processing apparatus 10 is worn on the left arm or the right arm. This will now be specifically described with reference to FIGS. 19 and 20.

Figure 19:
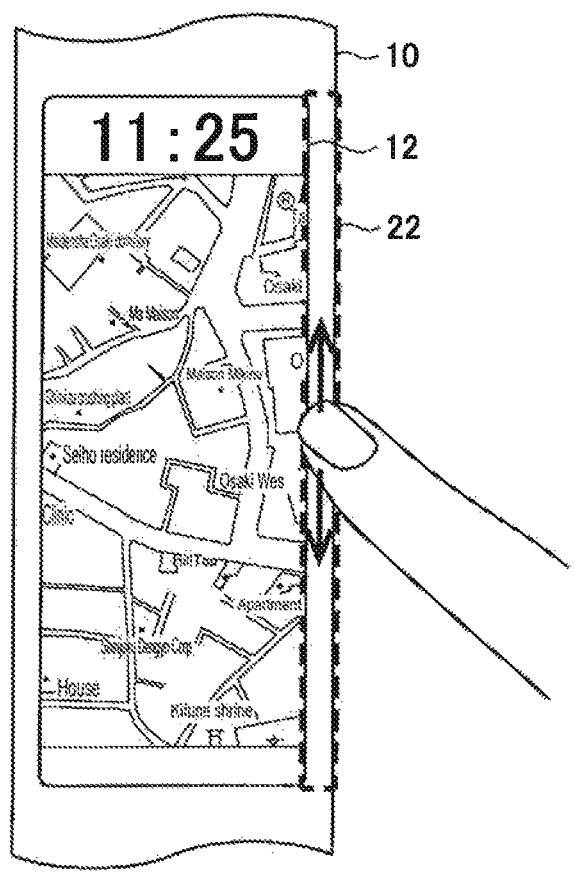
FIG. 19 is a diagram for describing assignment of a zoom operation region when an information processing apparatus according to this embodiment is worn on the left arm.

FIG. 19 is a diagram for describing the assignment of the zoom operation region when the information processing apparatus 10 according to this embodiment is worn on the left arm. As shown in FIG. 19, when it is determined that the information processing apparatus 10 which is a wristwatch terminal is worn on the left arm (state 2 shown in FIG. 14), the touch sensor is controlled so that a right off-screen region 22 is assigned a zooming operation. As a result, the situation that the screen is hidden by the user's right hand as it is being used to touch the left off-screen region, can be avoided.

Figure 20:
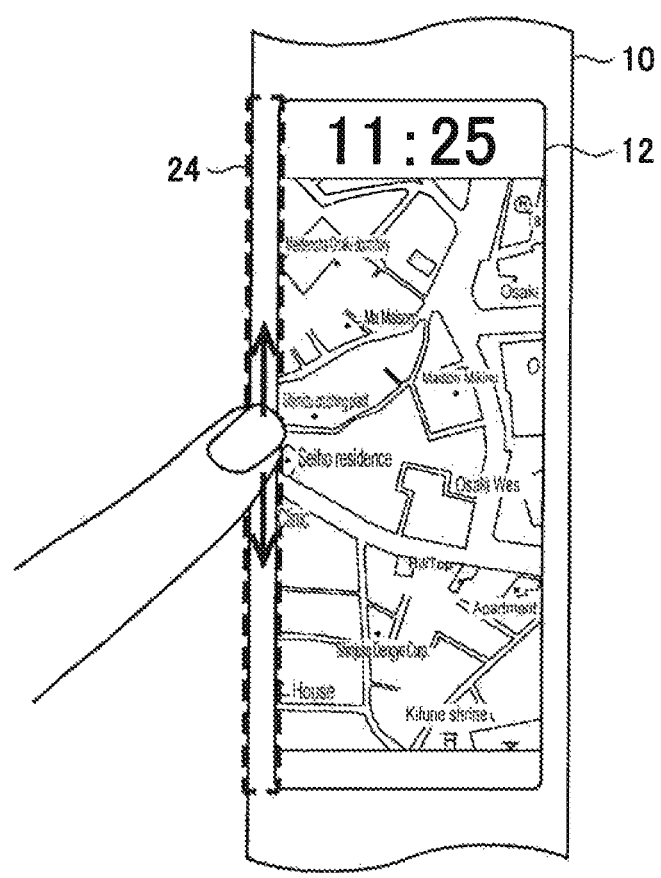
FIG. 20 is a diagram showing a display screen example where an information processing apparatus according to this embodiment is worn on the right arm.
Figure 21:
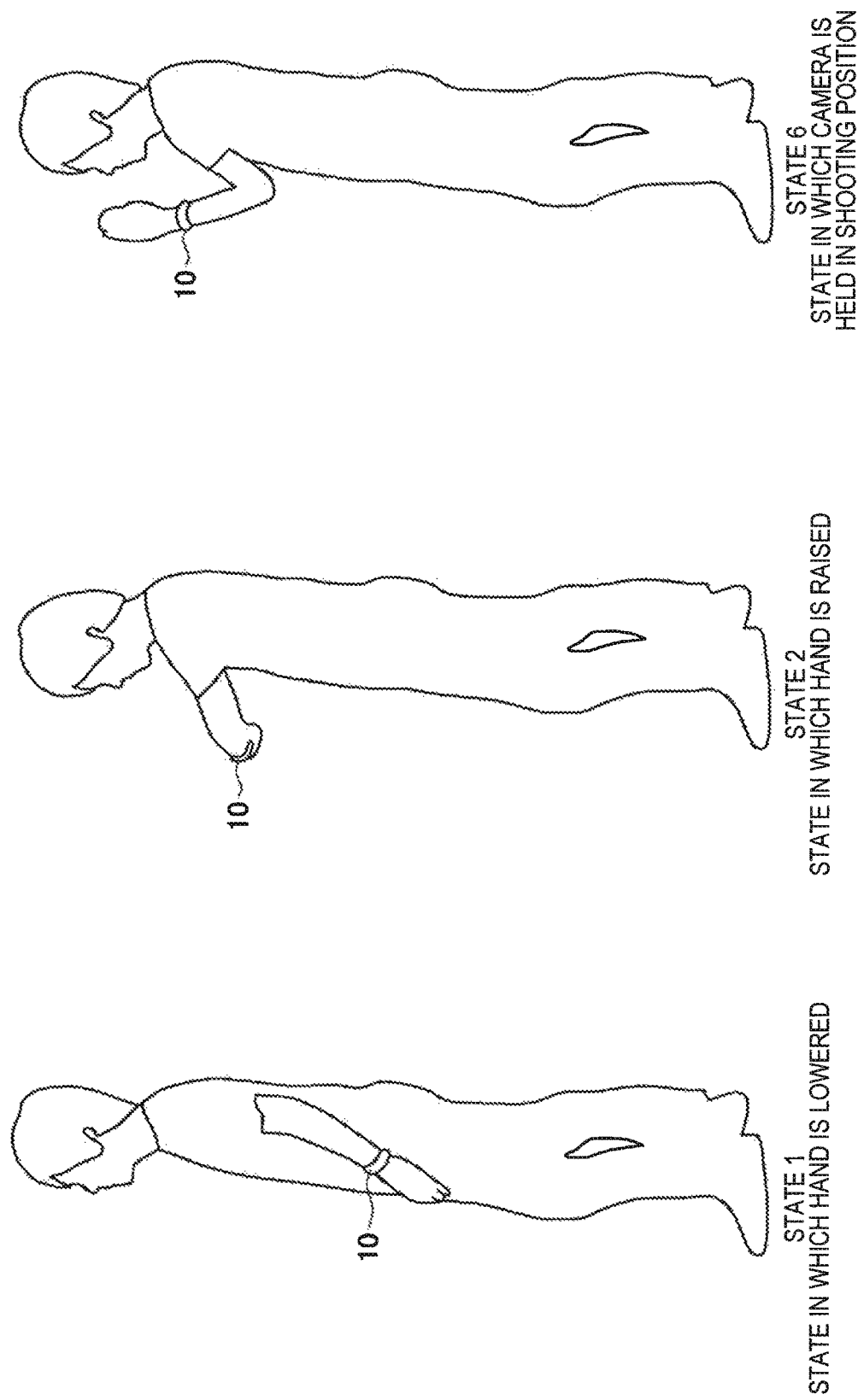
FIG. 21 is a diagram for describing state 1, state 2, and state 6.

FIG. 20 is a diagram showing a display screen example where the information processing apparatus 10 according to this embodiment is worn on the right arm. As shown in FIG. 20, when it is determined that the information processing apparatus 10 which is a wristwatch terminal is worn on the right arm (state 5 shown in FIG. 14), the touch sensor is controlled so that a left off-screen region 24 is assigned a zooming operation. As a result, the situation that the screen is hidden by the user's left hand as it is being used to touch the right off-screen region, can be avoided.

As described above, in this embodiment, the specific operation detection region is switched according to whether the information processing apparatus 10 is worn on the left arm or the right arm, whereby the usability of the information processing apparatus 10 can be further improved. Note that, in the information processing apparatus 10 according to this embodiment, one of the off-screen regions which is not assigned a zooming operation may be assigned a predetermined operation which is relatively less frequently used (less frequently than the zooming operation).

For example, the device control unit 112 of the information processing apparatus 10 may perform control so that one of the off-screen regions which is not assigned a zooming operation is assigned a screen rotating operation. For example, the screen can be rotated clockwise/anticlockwise by dragging vertically in the off-screen region. Thus, an off-screen region on one side in which an operation can be performed without the screen being hidden may be assigned the task of detecting an operation which is relatively frequently performed, while an off-screen region on the opposite side may be assigned the task of detecting an operation which is relatively less frequently performed, whereby a comfortable operation can be provided.

3-4. Device Control Example in State 6

Next, assuming that the information processing apparatus 10 has a camera function, a device control example in state 6 where a camera is held in a shooting position will be described with reference to FIGS. 21 to 24. The configuration of the information processing apparatus 10 according to this embodiment is not limited to the examples shown in FIGS. 1 to 3. For example, it is assumed that the information processing apparatus 10 according to this embodiment further includes an imaging unit (hereinafter referred to as a camera).

The camera has a lens system including an imaging lens, a diaphragm, a zooming lens, a focusing lens, and the like, a drive system for causing the lens system to perform a focusing operation or a zooming operation, a solid-state imaging element array for performing photoelectric conversion on imaging light obtained by the lens system to generate an imaging signal. The solid-state imaging element array may be implemented by, for example, a charge coupled device (CCD) sensor array or a complementary metal oxide semiconductor (CMOS) sensor array. The camera according to this embodiment can capture a still image and a moving image.

Although the position where the imaging lens is provided is not particularly illustrated, the imaging lens is provided on, for example, an outer circumferential surface of the information processing apparatus 10 between the speaker 15a and the mic 16a, and as shown in FIG. 2, when the information processing apparatus 10 is worn on the arm 200, the direction of shooting may be the direction in which the little finger (the outer side of the arm) faces. In this case, when the camera is used, the user raises and holds the arm on which the information processing apparatus 10 is worn, in front of the body, and aims the outer side (little finger) of the arm at a subject (aims the imaging lens at a subject), as shown in state 6 of FIG. 21.

The recognition unit 111 of the information processing apparatus 10 can recognize state 6 on the basis of a detection value from the motion sensor 13 provided in the information processing apparatus 10.

Figure 22:
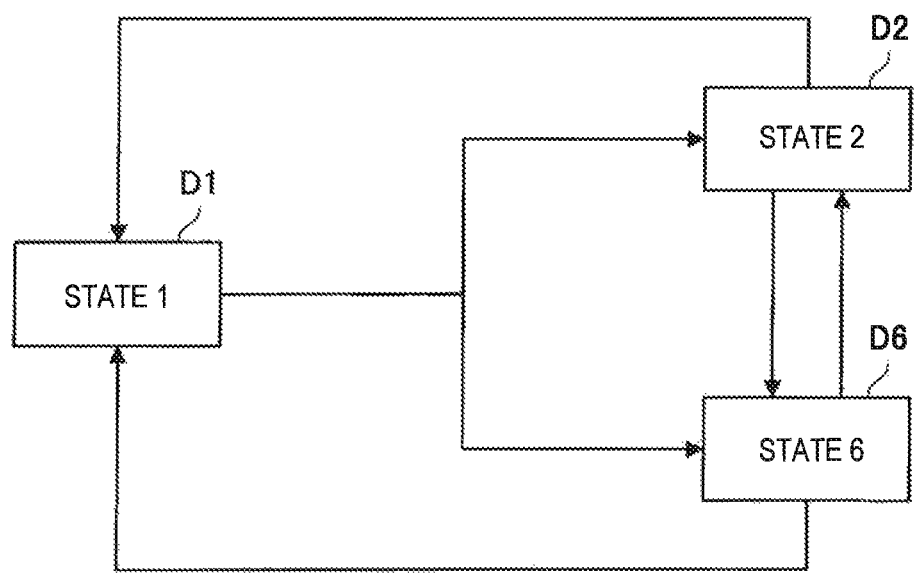
FIG. 22 is a state transition diagram showing transitions between state 1, state 2, and state 6.

FIG. 22 is a state transition diagram showing transitions between state 1, state 2, and state 6. As shown in FIG. 22, a transition can occur from state 1 (D1) in which the arm is lowered to state 2 (D2) in which the arm is raised, and vice versa. A transition can occur from state 1 (D1) in which the arm is lowered to state 6 (D6) in which the camera is held in a shooting position, and vice versa. A transition can occur from state 2 (D2) in which the arm is raised to state 6 (D6) in which the camera is held in a shooting position, and vice versa.

The recognition unit 111 of the information processing apparatus 10 recognizes the current state on the basis of a detection value from the motion sensor 13, and outputs the recognition result to the device control unit 112. Also, transitions occur between state 1, state 2, and state 6 as shown in FIG. 22. Therefore, the recognition unit 111 can recognize the current state in real time on the basis of detection values continuously output from the motion sensor 13.

Thereafter, the device control unit 112 performs predetermined control on each device according to the recognized state. For each state, the device control unit 112 can turn off the function of a device which is not to be used in the state to reduce power consumption, and turn on the function of a device which is to be used in the state without bothering to perform an operation to turn on (e.g., an explicit operation on the touchscreen 12), so that the function of a required device can be exhibited when necessary.

FIG. 23 is a diagram showing a list of control of devices in state 1, state 2, and state 6. As shown in FIG. 23, the camera is newly added to devices to be controlled.

As shown in FIG. 23, in state 1 in which the arm is lowered, the camera is not assumed to be used, and is controlled to be off.

Also, in state 2 in which the arm is held in a horizontal position in front of the body, the display is viewed, and the camera is not assumed to be used, and is controlled to be off. Also, as to the motion sensor, the gyroscopic sensor is controlled to be on. In this embodiment, a transition may occur from state 2 to state 6, and it is necessary to correctly detect a complicated motion of holding the camera in a shooting position. Therefore, when a transition to state 2 has occurred, the detection level of the motion sensor is increased. Note that, in this case, the sampling rate of the acceleration sensor may be set to high while the gyroscopic sensor is off.

In state 3 in which the camera is held in a shooting position, the camera is assumed to be used, and is controlled to be on (the camera is activated). Also, during shooting of a moving image, the mic is controlled to be on, and the sensitivity thereof is set to high. Meanwhile, during shooting of a still image, it is not necessary to collect sounds using the mic, and the mic is controlled to be off. Note that the camera may be switched between still image shooting and moving image shooting, in response to the recognition of an additional action of swinging the arm in state 6.

Also, in state 3, the touch sensor, the display, and the speaker (the back speaker and the front speaker) are not assumed to be used, and are controlled to be off.

(Supplements)

The device control shown in FIG. 23 is merely illustrative, and this embodiment is not limited to this. For example, only a single motion sensor may be provided, and only a single speaker may be provided. In this case, the device control is performed according to the states as shown in FIG. 24, for example. FIG. 24 is a diagram showing a list of other control of devices in state 1, state 2, and state 6.

In state 6 shown in FIG. 24, as in the case shown in FIG. 23, the camera is assumed to be used, and is controlled to be on (the camera is activated). Also, the mic is similarly controlled to be on during shooting of a moving image, and the sensitivity thereof is set to high. Meanwhile, during shooting of a still image, it is not necessary to collect sounds using the mic, and the mic is controlled to be off.

Also, because only a single motion sensor is used, the sampling rate is set to high in state 2 in order to correctly detect a more complicated motion (a transition to state 6 in which the camera is held in a shooting position).

5. CONCLUSION

As described above, the state of the arm is recognized on the basis of the determination of whether the information processing apparatus 10 according to an embodiment of the present disclosure which is a wristwatch terminal is worn on the left arm or the right arm, and the devices in the information processing apparatus 10 can be controlled according to the recognized state of the arm.

Also, in wristwatch terminals, only a small-size battery is mounted, and therefore, it is necessary to invariably reduce the power consumption. Under these circumstances, the information processing apparatus 10 according to this embodiment is controlled so that an unnecessary device is turned off according to a user context corresponding to the recognized state of the arm, whereby the power consumption can be reduced.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, a computer program that allows hardware including CPU, ROM, and RAM incorporated in the above-described information processing apparatus 10 to perform functions of the information processing apparatus 10 may also be created. A storage medium on which the computer program is stored may be provided.

Also, a transition may occur between any combination of states 1 to 6. Also, the relationship between the states and the device control is merely illustrative. The device control unit 112 according to this embodiment may perform control so that a user context associated with the recognized state (viewing the display, canine, mailing, listening to music, etc.) is satisfied.

Also, the device control according to the action of rotating the arm as shown in state 4 of FIG. 9 or the action of twisting the arm as shown in the bottom of FIG. 13, are not limited to the above screen transition (returning to the immediately previous screen/proceeding to the next screen) or volume control. For example, the device control may include moving to a home screen, calling a notification screen, activating a specific application (camera, telephone, map (navigation)), displaying a communication history (telephone, mail, SNS), and the like.

Also, the determination unit 110 can determine the orientation (i.e., upward or downward) of the touchscreen 12 (screen) of the information processing apparatus 10, on the basis of a detection value of a motion sensor, in addition to the determination of whether the information processing apparatus 10 is worn on the left arm or the right arm. As a result, the device control unit 112, when performing control so that the display is turned on, can display the display screen in a normal orientation. Also, by switching parameters used during state recognition performed by the recognition unit 111 according to the orientation (upward or downward) determination, the state of the arm can be more correctly recognized.

Also, the left and right determination, parameter changing, and device control techniques of the present disclosure are applicable to a glasses-type HMD (an example of the information processing apparatus 10) having a display unit corresponding to a left or right lens portion. For example, the setting of a parameter used in recognition of a gesture can be switched on the basis of determination of whether the glasses-type HMD is worn in front of the left eye or the right eye. Also, the display of the display unit corresponding to a lens portion is controlled on the basis of determination of whether the glasses-type HAM is worn in front of the left eye or the right eye (e.g., a control is performed to determine whether a command system is to be displayed on the left side or the right side, etc.).

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing apparatus including:
a determination unit configured to determine whether the information processing apparatus is worn on a user's right arm or left arm;
a recognition unit configured to recognize a state of the arm; and
a control unit configured to perform predetermined control on a device included in the information processing apparatus according to the recognized state of the arm,
wherein the recognition unit switches settings of a parameter which is used in the recognition of the state of the arm, according to a result of the determination by the determination unit.

(2)

The information processing apparatus according to (1), wherein the information processing apparatus is a wristwatch device.

(3)

The information processing apparatus according to 1) or (2),
wherein the control unit controls each device according to a user context corresponding to the recognized state of the arm.

(4)

The information processing apparatus according to any one of (1) to (3),
wherein the determination unit determines whether the information processing apparatus is worn on the left arm or the right arm, on the basis of a value acquired by a motion sensor that detects a motion of the arm.

(5)

The information processing apparatus according to any one of (1) to (3),
wherein the determination unit determines whether the information processing apparatus is worn on the left arm or the right arm, by mechanical learning using values acquired by a motion sensor that detects a motion of the arm.

(6)

The information processing apparatus according to any one of (1) to (3),
wherein the determination unit determines whether the information processing apparatus is worn on the left arm or the right arm, on the basis of the user's input.

(7)

The information processing apparatus according to any one of (1) to (6),
wherein the recognition unit switches the sign of the parameter according to the result of the determination by the determination unit.

(8)

The information processing apparatus according to any one of (1) to (7),
wherein the device included in the information processing apparatus is at least one of a display unit, an operation unit, a motion sensor, a speaker, a microphone, and an imaging unit.

(9)

A control method including:
determining whether an information processing apparatus is worn on a user's right arm or left arm;
switching settings of a parameter used in recognition of a state of the arm according to a result of the determination, and recognizing the state of the arm; and
performing predetermined control on a device included in the information processing apparatus according to the recognized state of the arm.

(10)

A program for causing a computer to function as:
a determination unit configured to determine whether an information processing apparatus is worn on a user's right arm or left arm;
a recognition unit configured to recognize a state of the arm; and
a control unit configured to perform predetermined control on a device included in the information processing apparatus according to the recognized state of the arm,
wherein the recognition unit switches settings of a parameter which is used in the recognition of the state of the arm, according to a result of the determination by the determination unit.

REFERENCE SIGNS LIST 10 information processing apparatus
11 main control unit
110 determination unit
111 recognition unit
112 device control unit
12 touch panel display
13 motion sensor
14 storage unit
15, 15a, 15b speaker
16, 16a, 16b microphone
17 communication unit

The invention claimed is:

1. An information processing apparatus comprising:
circuitry configured to
recognize a first state of an arm of a user based on a first value, wherein the first value is detected from a motion sensor,
recognize a second state of the arm of the user based on a second value, wherein the second value is detected from the motion sensor,
recognize that a transition has occurred between the first state and the second state,
recognize a user context according to the recognized transition, and
perform a control of the information processing apparatus according to the user context, wherein the circuitry is further configured to
recognize the first state in which the arm is raised and held in front of a body of the user and the second state in which the arm is held close to an ear of the user, and
recognize the user context which the user answers a call according to the transition between the first state and the second state in a call state.

2. The information processing apparatus according to claim 1,
wherein the circuitry performs the control of the information processing apparatus by controlling at least one selected from a group consisting of a display unit, an operation unit, a motion sensor, a speaker, a microphone, and an imaging unit.

3. The information processing apparatus according to claim 1,
wherein the circuitry is further configured to determine whether the information processing apparatus is worn on a right arm or a left arm of the user.

4. The information processing apparatus according to claim 3,
wherein the circuitry is further configured to determine whether the information processing apparatus is worn on the left arm or the right arm, on the basis of motion detected by the motion sensor.

5. The information processing apparatus according to claim 3,
wherein the circuitry is further configured to determine whether the information processing apparatus is worn on the left arm or the right arm, by mechanical learning using values acquired by the motion sensor.

6. The information processing apparatus according to claim 3,
wherein the circuitry is further configured to determine whether the information processing apparatus is worn on the left arm or the right arm, on the basis of a user input.

7. The information processing apparatus according to claim 3,
wherein the circuitry is further configured to switch a setting of a parameter for recognition of the transition, based on whether the information processing apparatus is determined to be worn on the right arm or the left arm of the user.

8. The information processing apparatus according to claim 1,
wherein the circuitry is further configured to
recognize the first state in which the arm is raised and held in front of a body of the user and a third state in which the arm is lowered, and
recognize the user context which the user does not answer a call according to the transition between the first state and the third state in a call state.

9. The information processing apparatus according to claim 8,
wherein the circuitry is further configured to perform a control to send a message to an information processing terminal of another side of the call and end the call, according to the user context.

10. The information processing apparatus according to claim 1,
wherein the circuitry is further configured to perform a control to start a call, according to the user context.

11. The information processing apparatus according to claim 1,
wherein the circuitry is further configured to
recognize the second state in which the arm is held close to an ear of the user and the first state in which the arm is raised and held in front of a body of the user, and
recognize the user context which the user checks a display and continues a call according to the transition between the second state and the first state in a call state.

12. The information processing apparatus according to claim 11,
wherein the circuitry is further configured to perform a control to increase an output of a speaker and switching on a touch sensor, according to the user context.

13. The information processing apparatus according to claim 1,
wherein the circuitry is further configured to
recognize the first state in which the arm is raised and held in front of a body of the user and a fourth state in which the arm is rotated in front of the body, and
perform a control of returning the display to a previous screen or proceeding to a next screen according to the transition between the first state and the fourth state.

14. The information processing apparatus according to claim 1,
wherein the circuitry is further configured to
recognize the first state in which the arm is raised and held in front of a body of the user and a fifth state in which a camera is held in a shooting position, and
perform a control to switch on the camera according to the transition between the first state and the fifth state.

15. The information processing apparatus according to claim 14,
wherein the circuitry is further configured to
recognize the fifth state in which the camera is held in the shooting position and a sixth state in which the information processing apparatus is swung, and
perform a control to switch a mode from image shooting to moving image shooting according to the transition between the fifth state and the sixth state.

16. The information processing apparatus according to claim 1,
wherein the circuitry is further configured to perform a control of at least one of a plurality of sensors according to the recognized transition.

17. The information processing apparatus according to claim 1,
wherein the circuitry performs the control to optimize the information processing apparatus by turning off at least one function of the information processing apparatus according to the user context.

18. The information processing apparatus according to claim 1,
wherein the circuitry performs the control of the information processing apparatus by activating a predetermined application based on the user context.

19. The information processing apparatus according to claim 18,
wherein the predetermined application is determined, from a plurality of different applications, for activation based on the user context.

20. A control method comprising:
recognizing a first state of an arm of a user based on a first value, wherein the first value is detected from a motion sensor;
recognizing a second state of the arm of the user based on a second value, wherein the second value is detected from the motion sensor;
recognizing that a transition has occurred between the first state and the second state;
recognizing a user context according to the recognized transition; and
performing a control of the information processing apparatus according to the user context,
wherein the first state is recognized in which the arm is raised and held in front of a body of the user, the second state is recognized in which the arm is held close to an ear of the user, and the user context is recognized in which the user answers a call according to the transition between the first state and the second state in a call state.

21. A non-transitory computer-readable medium having embodied thereon a program, which when executed by a computer causes the computer to execute a method, the method comprising:

recognizing a first state of an arm of a user based on a first value, wherein the first value is detected from a motion sensor;
recognizing a second state of the arm of the user based on a second value, wherein the second value is detected from the motion sensor;
recognizing that a transition has occurred between the first state and the second state;
recognizing a user context according to the recognized transition; and
performing a control of the information processing apparatus according to the user context,
wherein the first state is recognized in which the arm is raised and held in front of a body of the user, the second state is recognized in which the arm is held close to an ear of the user, and the user context is recognized in which the user answers a call according to the transition between the first state and the second state in a call state.

* * * * *